US011946194B2

(12) United States Patent
Kang et al.

(10) Patent No.: US 11,946,194 B2
(45) Date of Patent: *Apr. 2, 2024

(54) CLOTHING TREATMENT APPARATUS

(71) Applicant: LG Electronics Inc., Seoul (KR)

(72) Inventors: Hyungha Kang, Seoul (KR); Jaehyung Kim, Seoul (KR); Semin Jang, Seoul (KR); Joosik Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,580

(22) Filed: Sep. 19, 2022

(65) Prior Publication Data

US 2023/0007858 A1 Jan. 12, 2023

Related U.S. Application Data

(63) Continuation of application No. 16/957,772, filed as application No. PCT/KR2018/015557 on Dec. 7, 2018, now Pat. No. 11,486,080.

(30) Foreign Application Priority Data

Dec. 8, 2017 (KR) ........................ 10-2017-0168515
Dec. 8, 2017 (KR) ........................ 10-2018-0152200

(51) Int. Cl.
*D06F 58/20* (2006.01)
*B06B 1/14* (2006.01)
(Continued)

(52) U.S. Cl.
CPC ................ *D06F 58/20* (2013.01); *B06B 1/14* (2013.01); *D06F 58/10* (2013.01); *D06F 58/12* (2013.01);
(Continued)

(58) Field of Classification Search
CPC .......... D06F 58/20; D06F 58/10; D06F 58/12; D06F 58/203; D06F 69/00; D06F 73/02;
(Continued)

(56) References Cited

U.S. PATENT DOCUMENTS 2,206,386 A 7/1940 Bernhard
3,114,919 A 12/1963 Kenreich
(Continued)

FOREIGN PATENT DOCUMENTS

CN 101997357 A 3/2011
CN 102301061 A 12/2011
(Continued)

OTHER PUBLICATIONS

European Search Report, dated Aug. 19, 2021, issued in Patent Application No. 18885946.6 (11 pages).
(Continued)

*Primary Examiner* — Ismael Izaguirre
(74) *Attorney, Agent, or Firm* — Birch, Stewart, Kolasch & Birch, LLP

(57) ABSTRACT

A clothing treatment apparatus includes a frame, a hanger body provided to hang clothing or a hanger, and a vibration module generating vibration, and configured to move the hanger body with respect to the frame. The vibration module includes a first eccentric portion rotating about a predetermined first rotation axis, a second eccentric portion rotating about a predetermined second rotation axis that is spaced apart from and parallel to the first rotation axis, and a vibrating body fixed to a predetermined central axis that is fixed to the frame and disposed between the first rotation axis and the second rotation axis. The first eccentric portion and the second eccentric portion rotate in the same direction to rotate the vibrating body about the central axis.

20 Claims, 19 Drawing Sheets

(51) Int. Cl.
*D06F 58/10* (2006.01)
*D06F 58/12* (2006.01)
*D06F 69/00* (2006.01)
*D06F 73/02* (2006.01)

(52) U.S. Cl.
CPC ............ *D06F 58/203* (2013.01); *D06F 69/00* (2013.01); *D06F 73/02* (2013.01)

(58) Field of Classification Search
CPC .. D06F 73/00; B06B 1/14; B06B 1/10; B06B 1/12; B06B 1/16
See application file for complete search history.

(56) References Cited

U.S. PATENT DOCUMENTS

| | | | | |
|---|---|---|---|---|
| 4,903,471 | A * | 2/1990 | Bunnelle | A01D 46/26 56/340.1 |
| 4,942,776 | A * | 7/1990 | Quirk | F16H 57/0006 74/DIG. 10 |
| 5,134,893 | A * | 8/1992 | Hukki | B06B 1/163 74/61 |
| 6,516,679 | B2 | 2/2003 | Yates et al. | |
| 7,103,996 | B2 | 9/2006 | Hapke | |
| 7,137,211 | B2 | 11/2006 | Johnson et al. | |
| 8,539,694 | B2 * | 9/2013 | Moon | D06F 58/20 8/149.1 |
| 11,486,080 | B2 * | 11/2022 | Kang | B06B 1/14 |
| 2006/0037209 | A1 | 2/2006 | Johnson et al. | |
| 2012/0017654 | A1 | 1/2012 | Park et al. | |
| 2012/0232780 | A1 * | 9/2012 | Delson | A63F 13/24 340/407.1 |
| 2017/0350066 | A1 | 12/2017 | Kim | |

FOREIGN PATENT DOCUMENTS

| | | | |
|---|---|---|---|
| CN | 103276571 | A | 9/2013 |
| CN | 103510357 | A | 1/2014 |
| EP | 0473449 | A1 | 3/1992 |
| EP | 1867402 | A1 | 12/2007 |
| EP | 2385168 | A2 | 11/2011 |
| JP | 06-339598 | A | 12/1994 |
| KR | 97-27428 | A | 6/1997 |
| KR | 10-0166924 | B1 | 4/1999 |
| KR | 10-2010-0066176 | A | 6/2010 |
| KR | 10-2011-0067864 | A | 6/2011 |
| KR | 10-2014-0108455 | A | 9/2014 |
| KR | 10-2014-0112386 | A | 9/2014 |
| KR | 10-1525568 | B1 | 6/2015 |
| KR | 20-2015-0004095 | U | 11/2015 |
| SU | 1442582 | A1 | 12/1988 |
| WO | WO2015/126073 | A1 | 8/2015 |

OTHER PUBLICATIONS

Korean Office Action, dated Jan. 18, 2019, issued in Korean Patent Application No. KR-10-2017- 0168515 (5 pages).
Notice of Allowance in Russian Application No. 2020122229 dated Nov. 27, 2020 (11 pages).
Notice of Allowance, dated Feb. 25, 2021, issued in Korean Application No. 10-2018-0152200 (6 pages including translation).
Office Action, dated Feb. 26, 2021, issued in Australian Application No. 2018380777 (7 pages).
PCT International Search Report, dated Apr. 8, 2019, issued in International Application No. PCT/KR2018/015557 (7 pages).

* cited by examiner

CLOTHING TREATMENT APPARATUS

CROSS-REFERENCE TO RELATED APPLICATIONS

This application is a Continuation of application Ser. No. 16/957,772, filed on Jun. 25, 2020, which is the National Phase under 35 U.S.C. § 371 of International Application No. PCT/KR2018/015557, filed on Dec. 7, 2018, which claims the benefit under 35 U.S.C. § 119(a) to Patent Application No. 10-2018-0152200, filed in the Republic of Korea on Dec. 8, 2017, and Patent Application No. 10-2017-0168515, filed in the Republic of Korea on Dec. 8, 2017, all of which are hereby expressly incorporated by reference into the present application.

TECHNICAL FIELD

The present disclosure relates to a structure which vibrates clothing in a clothing treatment apparatus.

BACKGROUND ART

A clothing treatment apparatus refers to all apparatuses for managing or treating clothing, such as washing or drying cloth, or removing wrinkles of clothing at home or in a laundry. For example, the clothing treatment apparatus includes a washing machine for washing clothing, a dryer for drying clothing, a washing machine/dryer having both washing and drying functions, a refresher for refreshing clothing, a steamer to remove unnecessary wrinkles of clothing, or the like.

More specifically, the refresher is an apparatus for making clothing more pleasant and fresh, and performs functions such as drying clothing, supplying fragrance to clothing, preventing occurrence of static electricity in clothing, and removing wrinkles of clothing. In general, the steamer is an apparatus which removes wrinkles of clothing by supplying steam to clothing, and unlike a typical iron, in the steamer, clothing does not come into contact with a heating plate, and thus, it is possible to delicately removes wrinkles of the clothing. A clothing treatment apparatus is known, which has functions of the refresher and the steamer together and performs functions such as removing wrinkles and odors of clothing stored therein by using steam and hot air.

In addition, a clothing treatment apparatus is known, which exerts a function of unfolding wrinkles of clothes by vibrating (reciprocating) a clothing hanger rod in a predetermined direction.

Technical Problem

In the related art, when a hanger rod is vibrated, there is a problem that unnecessary vibrations occur even in a direction other than a vibrating direction. A first object of the present disclosure is to solve this problem and minimize unnecessary vibrations.

A second object of the present disclosure is to effectively increase an excitation force in the vibrating direction applied to the hanger rod while minimizing the unnecessary vibrations.

In the prior art, an amplitude is maintained even when a frequency of the hanger rod is changed, which causes a damage in a product. A third object of the present disclosure is to solve this problem and reduce the damage of the product even if the frequency is changed.

A fourth object of the present disclosure to cause the hanger rod to perform a vibration motion capable of adjusting various frequencies and amplitudes, when the hanger rod vibrates.

Technical Solution

In order to achieve the above-described objects, according to an aspect of the present disclosure, there is provided a clothing treatment apparatus including: a frame; a hanger body which is disposed to be movable to the frame and is provided to hang clothing or a hanger; a vibrating body which is rotatably provided about a predetermined central axis having a fixed relative position to the frame; a first eccentric portion which is supported by the vibrating body and rotates with eccentric weight about a predetermined first rotation axis spaced apart from the central axis; a second eccentric portion which is supported by the vibrating body and rotates with eccentric weight about a predetermined second rotation axis which is spaced apart from the central axis and is the same as or parallel to the first rotation axis; and a hanger driving unit which is disposed in the vibrating body and is connected to the hanger body at a position spaced apart from the central axis. A centrifugal force of the first eccentric portion with respect to the first rotation axis and a centrifugal force of the second eccentric portion with respect to the second rotation axis are provided to be reinforced with each other when the vibrating body generates a rotational force about the central axis, and are provided in directions opposite to each other when the vibrating body does not generate the rotational force.

In order to achieve the above-described objects, according to another aspect of the present disclosure, there is provided a clothing treatment apparatus including: a frame; a hanger module including a hanger body which is disposed to be movable to the frame and is provided to hang clothing or a hanger; and a vibration module which generates vibrations. The vibration module includes a vibrating body which is rotatably provided about a predetermined central axis having a fixed relative position to the frame, a first eccentric portion which is supported by the vibrating body and rotates with eccentric weight about a predetermined first rotation axis spaced apart from the central axis, a second eccentric portion which is supported by the vibrating body and rotates with eccentric weight about a predetermined second rotation axis which is spaced apart from the central axis and is the same as or parallel to the first rotation axis, and a hanger driving unit which is fixed to the vibrating body and is connected to the hanger body at a position spaced apart from the central axis. When weight of the first eccentric portion is eccentric to the first rotation axis in one direction (D1) of a clockwise direction (D11) and a counterclockwise direction (D12) based on the central axis, weight of the second eccentric portion is provided to be eccentric to the second rotation axis in the one direction (D1). When the weight of the first eccentric portion is eccentric to the first rotation axis in one direction (D2) of a centrifugal direction (Dr1) and a mesial direction (Dr2) based on the central axis, the weight of the second eccentric portion is provided to be eccentric to the second rotation axis in a direction opposite to the one direction (D2).

In order to achieve the above-described objects, according to still another aspect of the present disclosure, there is provided a clothing treatment apparatus including: a frame; a hanger module including a hanger body which is disposed to be movable to the frame and is provided to hang clothing or a hanger; and a vibration module which generates vibrations. The vibration module includes a vibrating body which is rotatably provided about a predetermined central axis having a fixed relative position to the frame, a first eccentric portion which is supported by the vibrating body and rotates with eccentric weight about a predetermined first rotation axis spaced apart from the central axis, a second eccentric portion which is supported by the vibrating body and rotates with eccentric weight about a predetermined second rotation axis which is spaced apart from the central axis and is the same as or parallel to the first rotation axis, and a hanger driving unit which is disposed in the vibrating body and is connected to the hanger body at a position spaced apart from the central axis. When weight of the first eccentric portion generates a centrifugal force with respect to the first rotation axis in one direction (D1) of a clockwise direction (D11) and a counterclockwise direction (D12) based on the central axis, the second eccentric portion is provided to generate a centrifugal force with respect to the second rotation axis in the one direction (D1). When the first eccentric portion generates a centrifugal force with respect to the first rotation axis in one direction (D2) of a centrifugal direction (Dr1) and a mesial direction (Dr2) based on the central axis, the second eccentric portion is provided to generate a centrifugal force with respect to the second rotation axis in a direction opposite to the one direction (D2).

In order to achieve the above-described objects, according to still another aspect of the present disclosure, there is provided a vibration module for a clothing treatment apparatus including: a vibrating body in which a predetermined central axis is preset; a first eccentric portion which is supported by the vibrating body and is preset to rotate with eccentric weight about a predetermined first rotation axis spaced apart from the central axis; a second eccentric portion which is supported by the vibrating body and is preset to rotate with eccentric weight about a predetermined second rotation axis which is spaced apart from the central axis and is the same as or parallel to the first rotation axis; and a hanger driving unit which is disposed in the vibrating body and is preset to be connected to an external hanger body at a position spaced apart from the central axis. A centrifugal force of the first eccentric portion with respect to the first rotation axis and a centrifugal force of the second eccentric portion with respect to the second rotation axis are provided to be reinforced with each other when the vibrating body generates a rotational force about the central axis, and are provided in directions opposite to each other when the vibrating body does not generate the rotational force.

The centrifugal force of the first eccentric portion with respect to the first rotation axis and the centrifugal force of the second eccentric portion with respect to the second rotation axis may be provided to cancel each other when the rotational force is not generated.

(i) A distance between the first rotation axis and the central axis and (ii) a distance between the second rotation axis and the central axis may be provided to be same as each other.

The first rotation axis and the second rotation axis may be spaced apart from the central axis in the same direction as each other or in directions opposite to each other.

The first rotation axis and the second rotation axis may be spaced apart from the central axis in the directions opposite to each other.

(i) An angular speed of the first eccentric portion about the first rotation axis and (ii) an angular speed of the second eccentric portion about the second rotation axis may be preset to be same as each other.

The clothing treatment apparatus may further include: a motor having a motor shaft which is provided in the vibrating body and disposed on the central axis; and a transmission unit which is disposed in the vibrating body and transmits a rotational force of the motor to each of the first eccentric portion and the second eccentric portion.

According to still another aspect of the present disclosure, there is provided a clothing treatment apparatus including: a frame which forms an exterior and forms a treatment space in which clothing is accommodated; a hanger module which is movable to the frame in an upper portion of the treatment space and is provided to hang the clothing or a hanger; a vibration module which is supported by the frame and generates vibrations in the hanger module, in which the vibration module includes a motor which rotates a central axis formed in an up-down direction, a first eccentric portion which is connected to the motor to be rotated and rotates with eccentric weight about a first rotation axis spaced apart to be parallel to the central axis, a second eccentric portion which is connected to the motor to be rotated and rotates with eccentric weight about a second rotation axis spaced apart to be parallel in a direction opposite to the first rotation axis from the central axis, a vibrating body which supports the motor, rotatably supports the first eccentric portion and the second eccentric portion, and is rotated by a centrifugal force of the first eccentric portion with respect to the first rotation axis and a centrifugal force of the second eccentric portion with respect to the second rotation axis in a clockwise direction and a counterclockwise direction within a predetermined angle range based on the central axis, and a hanger driving unit which transmits a rotational force of the vibrating body rotating within the predetermined angle range to the hanger module.

Advantageous Effects

According to the above-described aspects, a centrifugal force F1 of the first eccentric portion and a second centrifugal force F2 of the second eccentric portion inducing a rotation of the vibrating body around the central axis are reinforced with each other to apply an exciting force Fo to the hanger body, and the centrifugal force F1 and the centrifugal force F2 which does not induce the rotation of the vibrating body cancel each other. Accordingly, it is possible to suppress occurrence of vibrations caused by a centrifugal force irrelevant to generation of the exciting force Fo. (refer to FIGS. 2*a* to 3*d*)

The centrifugal force F1 and the centrifugal force F2 are provided to "completely cancel" each other, and thus, it is possible to further reduce occurrence of unnecessary vibrations in directions +Y and −Y perpendicular to predetermined vibration directions +X and −X.

(i) A distance between the first rotation axis and the central axis and (ii) a distance between the second rotation axis and the central axis are be provided to be same as each other. Accordingly, ratios of the centrifugal force F1 and the centrifugal force F2 contributing the generation of the exciting force Fo are the same as each other, and thus, it is possible to prevent a fatigue load from being concentrated on any one of a portion supporting the first eccentric portion and a portion supporting the second eccentric portion.

The first rotation axis and the second rotation axis are spaced apart from the central axis in the same direction as each other or in the directions opposite to each other. Accordingly, reinforcement and cancellation of the centrifugal force F1 and the centrifugal force F2 can be repeated regularly.

The first rotation axis and the second rotation axis are spaced apart from the central axis in the directions opposite to each other. Accordingly, it is possible to prevent the vibrating body from being eccentric to one side based on the central axis due to the weight of the first eccentric portion and the second eccentric portion.

The motor shaft disposed on the central axis is provided. Accordingly, it is possible to prevent eccentricity toward one side due to the weight of the motor about the central axis.

(i) An angular speed of the first eccentric portion about the first rotation axis and (ii) an angular speed of the second eccentric portion about the second rotation axis are preset to be same as each other. Accordingly, it is possible to periodically reinforce and cancel the centrifugal force F1 and centrifugal force F2 according to the rotations of the first eccentric portion and the second eccentric portion.

BRIEF DESCRIPTION OF DRAWINGS

FIGS. 2*a* to 3*d* are conceptual views illustrating an operation principle of a vibration module 50 of FIG. 1, FIGS. 2*a* to 2*d* are views illustrating operation principles of vibration modules 150 and 250 according to first and second embodiments, and FIGS. 3*a* to 3*d* are views illustrating an operation principle of a vibration module 350 according to a third embodiment.

DETAILED DESCRIPTION

Figure 1:
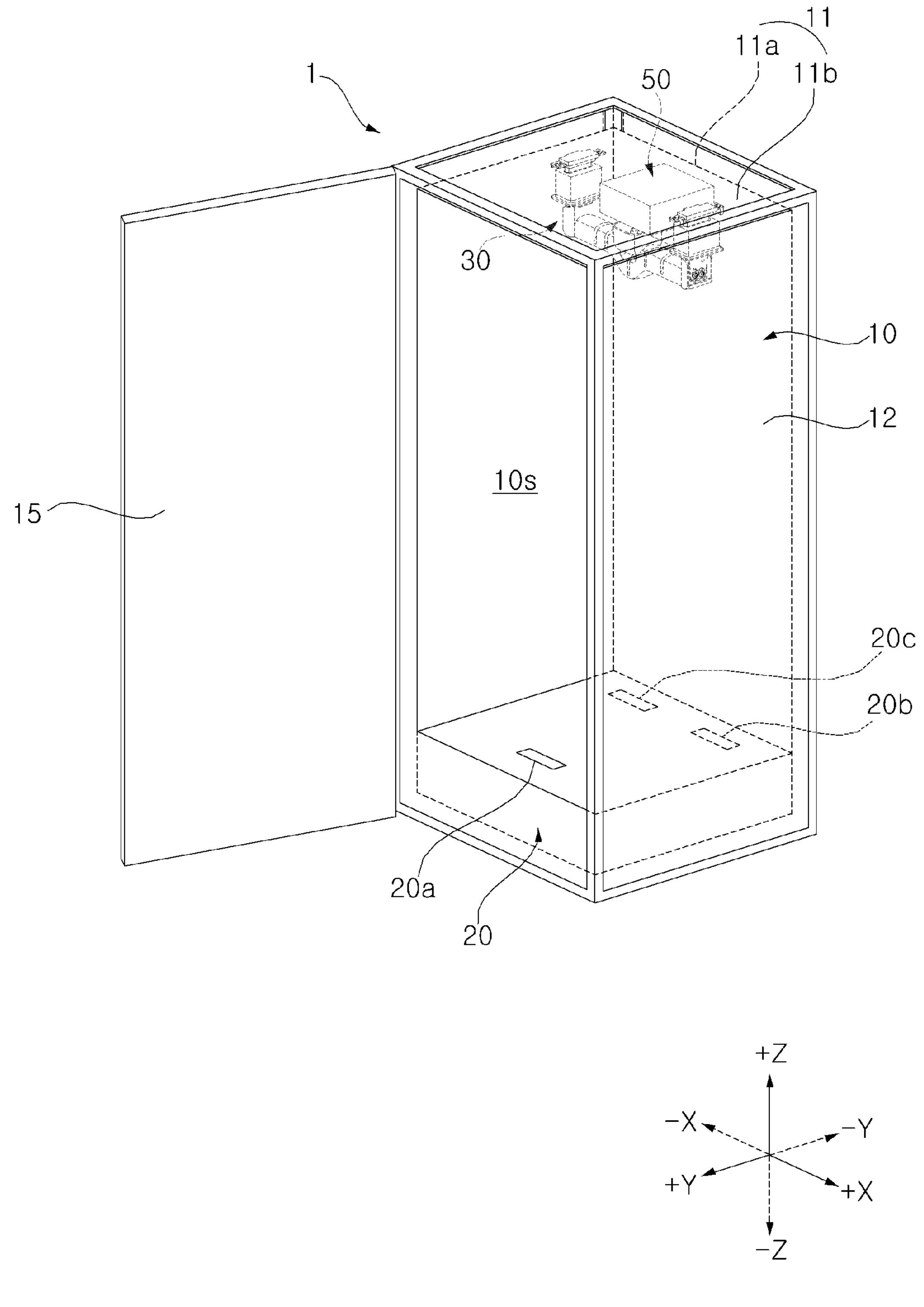
FIG. 1 is a perspective view of a clothing treatment apparatus 1 according to an embodiment of the present disclosure.

In order to explain the present disclosure, the following description will be made based on a spatial orthogonal coordinate system by an X-axis, a Y-axis and a Z-axis orthogonal to each other. Each axial direction (X-axis direction, Y-axis direction, Z-axis direction) means both directions in which each axis extends. A "+" sign (+X-axis direction, +Y-axis direction, +Z-axis direction) in front of each axial direction means a positive direction, which is one of both directions in which each axis extends. A "−" sign (−X-axis direction, −Y-axis direction, −Z-axis direction) in front of each axial direction means a negative direction, which is the other of both directions in which each axis extends.

The expressions referring to directions such as "before (+Y)/after (−Y)/left (+X)/right (−X)/up (+Z)/down (−Z)" mentioned below are defined according to an XYZ coordinate axis. However, the expressions are only to explain the present disclosure to be clearly understood, and it is needless to say that each direction may be defined differently depending on where a reference is placed.

The use of terms such as "first, second, and third" in front of the components mentioned below is only to avoid confusion of referred components, and is irrelevant to an order, an importance, or a master/slave relationship between the components. For example, an embodiment including only a second component without a first component can be implemented.

As used herein, a singular expression includes a plural expression unless a context clearly indicates otherwise.

Referring to FIGS. 1, 4 to 8, and 14 to 17, a clothing treatment apparatus 1 according to an embodiment of the present disclosure includes a frame 10 which is placed on an external floor or fixed to an external wall. The frame 10 forms a treatment space 10*s* for receiving clothing. The clothing treatment apparatus 1 includes a supply unit 20 which supplies at least one of air, steam, fragrance, and an antistatic agent to the clothing. The clothing treatment apparatus 1 includes a hanger module 30 which is provided to hang the clothing or a hanger. The hanger module 30 is supported by the frame 10. The clothing treatment apparatus 1 includes vibration modules 50, 150, 250, and 350 which generate vibrations. The vibration modules 50, 150, 250, and 350 vibrate the hanger module 30. The clothing treatment apparatus 1 includes elastic members 60 and 360 which are provided to be elastically deformed or elastically restored when the hanger module 30 is operated. The elastic members 60 and 360 are provided to be elastically deformed or elastically restored when the vibration modules 50, 150, 250, and 350 are operated. The clothing treatment apparatus 1 includes support members 70 and 370 supporting one end of each of the elastic members 60 and 360. The support members 70 and 370 may support the vibration modules 50, 150, 250, and 350 so that the vibration modules are operated. The support members 70 and 370 may be fixed to the frame 10. The clothing treatment apparatus 1 may include a controller (not illustrated) which controls an operation of the supply unit 20. The controller may control whether the vibration modules 50, 150, 250, and 350 are operated and operation patterns thereof. The clothing treatment apparatus 1 may further include a clothing recognition sensor (not illustrated) which detects clothing accommodated inside the treatment space 10*s*.

The frame 10 forms an exterior. The frame 10 forms the treatment space 10*s* in which clothing is accommodated. The frame 10 includes a top frame 11 forming an upper surface, side frames 12 forming right and left side surfaces, and a rear frame (not illustrated) forming a rear surface. The frame 10 includes a base frame (not illustrated) forming a bottom surface.

The frame 10 may include an inner frame 11*a* forming an inner surface and an outer frame 11*b* forming an outer surface. The inner surface of the inner frame 11*a* forms a processing space 10*s*. A disposition space 11*s* is formed between the inner frame 11*a* and the outer frame 11*b*. The vibration modules 50, 150, 250, and 350 may be disposed in the disposition space 11*s*. The elastic members 60 and 360 and the support members 70 and 370 may be disposed in the disposition space 11*s*.

In the treatment space 10*s*, physical or chemical properties of the clothing by applying air (for example, hot air), steam, fragrance, and/or an antistatic agent to the clothing are changed. For example, the clothing is treated in various ways in the treatment space 10*s*. That is, the clothing is dried by applying hot air to the clothing, the wrinkles formed on the clothing are spread using steam, the fragrance is sprayed to the clothing so as treat fragrance, or the antistatic agent is sprayed to the clothing to prevent occurrence of static electricity in the clothing.

At least a portion of the hanger module 30 is disposed in the treatment space 10*s*. A hanger body 31 is disposed in the treatment space 10*s*. The treatment space 10*s* has one surface open to allow clothing to enter and exit, and the opened surface is opened and closed by a door 15. When the door 15 is closed, the treatment space 10*s* is isolated from an outside, and when the door 15 is opened, the treatment space 10*s* is exposed to the outside.

The supply unit 20 may supply air into the treatment space 10*s*. The supply unit 20 may cause air in the treatment space 10*s* to circulate and supply air into the treatment space 10*s*. Specifically, the supply unit 20 may suck air in the treatment space 10*s* and discharge the air into the treatment space 10*s*. The supply unit 20 may supply external air into the treatment space 10*s*.

The supply unit 20 may supply air which is subjected to a predetermined treatment process into the treatment space 10*s*. For example, the supply unit 20 may supply heated air into the treatment space 10*s*. The supply unit 20 may supply cooled air into the treatment space 10*s*. In addition, the supply unit 20 may supply air that has not been separately processed into the treatment space 10*s*. Moreover, the supply unit 20 may add steam, fragrance or an antistatic agent to air and then, supply the air into the treatment space 10*s*.

The supply unit 20 may include an air intake port 20*a* through which air inside the treatment space 10*s* is sucked. The supply unit 20 may include an air discharge port 20*b* through which air is discharged into the treatment space 10*s*. The air sucked through the air intake port 20*a* may be subjected to a predetermined treatment and discharged through the air discharge port 20*b*. The supply unit 20 may include a steam injection port 20*c* through which steam is sprayed into the treatment space 10*s*. The supply unit 20 may include a heater (not illustrated) which heats the sucked air. The supply unit 20 may include a filter (not illustrated) which filters the sucked air. The supply unit 20 may include a fan (not illustrated) which pressurizes air.

The air and/or steam supplied by the supply unit 20 is applied to the clothing accommodated in the treatment space 10*s* to affect the physical or chemical properties of the clothing. For example, a tissue structure of clothing is relaxed and wrinkles are spread by hot air or steam, and unpleasant odor can be removed by reacting odor molecules bare in the clothing with steam. In addition, hot air and/or steam generated by the supply unit 20 can sterilize bacteria parasitized in the clothing.

Referring to FIGS. 1, 6, 16 and 17, the hanger module 30 may be disposed in an upper portion of the treatment space 10*s*. The hanger module 30 is provided to hang the clothing or the hanger. The hanger module 30 is supported by the frame 10. The hanger module 30 is provided to be movable. The hanger module 30 is connected to the vibration modules 50, 150, 250, and 350, and receives vibrations of the vibration modules 50, 150, 250, and 350.

The hanger module 30 includes a hanger body 31 which is provided to hang the clothing or the hanger. In the present embodiment, the hanger body 31 forms a locking groove 31*a* so that a hanger is hung. However, in other embodiments, the hanger body 31 may be provided with a hook (not illustrated) or the like to directly hang clothes.

The hanger body 31 is supported by the frame 10. The hanger body 31 may be connected to the frame 10 through a hanger movable portion 33 and a hanger support portion 35. The hanger body 31 is disposed movably relative to the frame 10. The hanger body 31 is provided to vibrate in predetermined vibration directions +X and −X. The hanger body 31 may vibrate in the vibration directions +X and −X with respect to the frame 10. The hanger body 31 reciprocates in the vibration directions +X and −X by the vibration modules 50, 150, 250, and 350. The hanger module 30 reciprocates while hanging on the upper portion of the treatment space 10*s*.

The hanger body 31 may be formed to extend long in the vibration directions +X and −X. The plurality of locking grooves 31*a* may be disposed on an upper side of the hanger body 31 to be spaced apart from each other in the vibration directions +X and −X. The locking grooves 31*a* may be formed to extend in directions +Y and −Y across to the vibration directions +X and −X.

The vibration modules 50, 150, 250 and 350 include the hanger driving units 58 and 358 connected to the hanger module 30. The hanger body 31 includes the hanger driven unit 31*b* connected to the hanger driving units 58 and 358. One of the hanger driving units 58 and 358 and the hanger driven unit 31*b* forms a slit extending in the directions +Y and −Y across the vibration directions +X and −X and the other protrudes parallel to a central axis Oc, which will be described later, to form a protrusion inserted into the slit.

In the present embodiment, the hanger driven unit 31*b* forms a slit 31*bh* extending in the directions +Y and −Y, and the hanger driving units 58 and 358 include protrusions 58*a* and 358*a* which protrude downward and are inserted into the slit 31*bh*. Although not illustrated, in other embodiments, the hanger driven unit may form a slit extending in the directions +Y and −Y, and the hanger driven unit may include a protrusion which protrudes upward and is inserted into the slit of the hanger driving unit.

The protrusions 58*a* and 358*a* protrude to be parallel to the central axis Oc. The protrusions 58*a* and 358*a* extend along a predetermined connection axis Oh which will be described later. The protrusions 58*a* and 358*a* are disposed on the connection axis Oh.

The slit 31*bh* is formed long in the directions +Y and −Y orthogonal to the vibration directions +X and −X of the hanger module 30. When the protrusions 58*a* and 358*a* rotate around the central axis Oc in a state of being inserted into the slits 31*bh*, while the protrusions 58*a* and 358*a* move relative to the slit 31*bh* in the orthogonal directions +Y and −Y, the hanger body 31 reciprocates in the vibration directions +X and −X. In partial cross-sectional views of FIGS. 6 and 16, the directions of an arc movement (rotational movement) within a predetermined range in the state where the protrusions 58*a* and 358*a* are inserted into the slits 31*bh* are illustrated by arrows. Accordingly, a movement range of the hanger driven unit 31*b* vibrating in right and left directions +X and −X is illustrated by dotted lines.

The hanger module 30 includes the hanger movable portion 33 which movably supports the hanger body 31. The hanger movable portion 33 is formed to be movable in the vibration directions +X and −X. The hanger movable portion 33 may be formed of a flexible material so that the hanger body 31 can move. The hanger movable portion 33 may include an elastic member which is elastically deformable when the hanger body 31 moves. An upper end of the hanger movable portion 33 is fixed to the frame 10 and a lower end thereof is fixed to the hanger body 31. The hanger movable portion 33 may extend vertically. The upper end of the hanger movable portion 33 is seated on the hanger support portion 35. The hanger movable portion 33 connects the hanger support portion 35 and the hanger body 31 to each other. The hanger movable portion 33 is disposed to penetrate the hanger guide portion 37 vertically. A length of a horizontal cross section of the hanger movable portion 33 in the vibration directions +X and −X is shorter than a length thereof in the directions +Y and −Y perpendicular to the vibration directions +X and −X.

The hanger module 30 includes the hanger support portion 35 fixed to the frame 10. The hanger support portion 35 fixes the hanger movable portion 33 to the frame 10. The hanger support portion 35 may be fixed to the inner frame 11*a*. An upper end of the hanger movable portion 33 may engage with and may be suspended by the hanger support portion 35. The hanger support portion 35 is formed in a horizontal plate shape, and the hanger movable portion 33 may be disposed to penetrate the hanger support portion 35.

The hanger module 30 may further include a hanger guide part 37 which guides a position of the hanger movable portion 33. The hanger guide portion 37 is fixed to the frame 10. A portion between the upper surface of the hanger guide portion 37 and the hanger movable portion 33 may be sealed. A lower portion of the hanger guide portion 37 is recessed upward to form a groove, and the hanger movable portion 33 can move in the vibration directions +X and −X in the groove of the hanger guide portion 37 recessed upward.

Referring to FIGS. 7, 8, and 14 to 17, the elastic members 60 and 360 are provided to be elastically deformed or elastically restored when the vibration modules 50, 150, 250, and 350 rotates about the central axis Oc. The elastic members 60 and 360 are provided to be elastically deformed or elastically restored when the vibrating bodies 51 and 351 rotate about the central axis Oc. The elastic members 60 and 360 may limit the vibration modules 50, 150, 250, and 350 so that the vibration modules 50, 150, 250, and 350 vibrate within a predetermined angular range. Elastic forces of the elastic members 60, 360 and centrifugal forces of the first eccentric portions 55 and 355 and the second eccentric portions 56 and 356 are synthesized, and vibration patterns (amplitude and frequency) of the vibration modules 50, 150, 250, and 350 can be determined.

One end of the elastic members 60 and 360 is fixed to the vibration modules 50, 150, 250, and 350 and the other end thereof is fixed to the support members 70 and 370. The elastic members 60 and 360 may include a spring or a windup spring. The support members 70 and 370 may include a tension spring, a compression springs, or a torsion spring.

Referring to FIGS. 4 to 8 and 14 to 17, the support members 70 and 370 are fixed to the frame 10. The support members 70 and 370 may be fixed to the inner frame 11*a*. The support members 70 and 370 may support the elastic members 60 and 360. The support members 70 and 370 support the vibration modules 50, 150, 250 and 350. The support members 70, 370 are supported by the vibration modules 50, 150, 250, and 350. The support members 70 and 370 rotatably support the vibration modules 50, 150, 250, and 350. The support members 70, 370 support the vibration module 50, 150, 250, and 350 so that the vibration modules 50, 150, 250, and 350 can rotate about the central axis Oc.

Referring to FIGS. 2*a* to 6, and 14 to 16, the vibration modules 50, 150, 250, and 350 will be briefly described as follows. The vibration modules 50, 150, 250, and 350 move (vibrate) the hanger body 31. The vibration modules 50, 150, 250, and 350 are connected to the hanger body 31, and transmits the vibrations of the vibration modules 50, 150, 250, and 350 to the hanger body 31.

The vibration modules 50, 150, 250, and 350 can be supported by the inner frame 11*a*. The vibration modules 50, 150, 250, and 350 can be fixed to the frame 10 by the support members 70 and 370. The vibration modules 50, 150, 250, and 350 may be disposed between the inner frame 11*a* and the outer frame 11*b*. The upper inner frame 11*a* is recessed downward to form the disposition space 11*s*, and the vibration modules 50, 150, 250, and 350 can be disposed in the disposition space 11*s*.

The vibration modules 50, 150, 250, and 350 may be located in an upper side of the treatment space 10*s*. The vibration modules 50, 150, 250, and 350 may be disposed above the hanger body 31.

The vibration modules 50, 150, 250 and 350 include the vibrating bodies 51 and 351 supported by the frame 10. The vibrating bodies 51 and 351 may be connected to the frame 10 by the support members 70 and 370. The vibrating bodies 51 and 351 form outer shapes of the vibration modules 50, 150, 250, and 350.

The vibration bodies 51 and 351 have the predetermined central axis Oc. The vibrating bodies 51 and 351 are rotatably provided about the predetermined central axis Oc having a fixed position relative to the frame 10. The support members 70 and 370 rotatably support the vibrating bodies 51 and 351.

The vibrating bodies 51 and 351 may be rotatably provided only within a predetermined angular range. For example, the frame 10 or the support members 70 and 370 may include a limit portion which can come into contact with the vibrating bodies 51 and 351 to limit the rotation ranges of the vibrating bodies 51 and 351. For example, elastic forces of the elastic members 60 and 360 may increase as the vibrating bodies 51 and 351 rotate, and thus, the elastic members 60 and 360 can limit the rotation ranges of the vibrating bodies 51 and 351.

The vibrating bodies 51 and 351 support the motors 52 and 352. The vibrating bodies 51 and 351 and the hanger driving units 58 and 358 are fixed to each other. The vibrating bodies 51 and 351 support weight shafts 54*a*, 54*b* and 354. The vibrating bodies 51 and 351 support the first eccentric portions 55 and 355 and the second eccentric portions 56 and 356. The vibrating bodies 51 and 351 may accommodate the first eccentric portions 55 and 355 and the second eccentric portions 56 and 356 therein.

The vibration modules 50, 150, 250, and 350 include first eccentric portions 55 and 355 which rotate with eccentric weight about a predetermined first rotation axis Ow1 spaced apart from the central axis Oc. The first eccentric portions 155, 255, and 355 are preset to rotate with eccentric weight about the first rotation axis Ow1. The vibration modules 50, 150, 250, and 350 include second eccentric portions 56 and 356 which rotate with eccentric weight about a predetermined second rotation axis Ow2 spaced apart from the central axis Oc. The second eccentric portions 156, 256, and 356 are preset to rotate with eccentric weight about the second rotation axis Ow2. Here, the first eccentric portion 55 collectively refers to the first eccentric portions 155 and 255 according to the first and second embodiments, and the second eccentric portion 56 collectively refers to the second eccentric portions 156 and 256 according to the first and second embodiments.

The first rotation axis Ow1 and the second rotation axis Ow2 may be the same as each other or different from each other. The second rotation axis Ow2 may be the same as or parallel to the first rotation axis Ow1. In the first and second embodiments, the first rotation axis Ow1 and the second rotation axis Ow2 are parallel to each other. In the third embodiment, the first rotation axis Ow1 and the second rotation axis are the same as each other.

The first eccentric portions 55 and 355 are supported by the vibrating bodies 51 and 351. The first eccentric portions 55 and 355 may be rotatably supported by the weight shafts 54*a* and 354 disposed in the vibrating bodies 51 and 351. The second eccentric portions 56 and 356 are supported by vibrating bodies 51 and 351. The second eccentric portions 56 and 356 may be rotatably supported by weight shafts 54*b* and 354 disposed in the vibrating bodies 51 and 351.

The first eccentric portions 55 and 355 include first rotating portions 155*b*, 255*b*, and 355*b* which come into contact with the transmission units 153, 253, and 353 and rotate about the first rotation axis Ow1. The first rotating portions 155*b*, 255*b*, and 355*b* receive rotational forces of the transmission units 153, 253, and 353. Each of the first rotating portions 155*b*, 255*b*, and 355*b* may be formed in a cylindrical shape about the first rotation axis Ow1 as a whole.

The first eccentric portions 55 and 355 include first weight members 55*a* and 355*a* fixed to the first rotating portions 155*b*, 255*b*, and 355*b*. The first weight members 55*a* and 355*a* rotate integrally with the first rotating portion 155*b*, 255*b*, and 355*b*. The first weight members 55*a* and 355*a* are formed of a material having specific gravity larger than the first rotating portions 155*b*, 255*b*, and 355*b*.

The first weight members 55*a* and 355*a* are disposed on one side about the first rotation axis Ow1 to induce eccentric weight of the first eccentric portions 55 and 355. Each of the first weight members 55*a* and 355*a* may be formed in a column shape having a semi-circular bottom surface as a whole. The first weight members 55*a* and 355*a* may be disposed in an angle range within 180° about the first rotation axis Ow1 at an arbitrary time point during the rotations of the first eccentric portions 55 and 355. In the present embodiment, the first weight members 55*a* and 355*a* are disposed in a range of 180° about the first rotation axis Ow1, at an arbitrary time point described above.

The second eccentric portions 56 and 356 include second rotating portions 155*b*, 255*b*, and 355*b* which come into contact with the transmission units 153, 253, and 353 and rotate about the second rotation axis Ow2. The second rotating portions 156*b*, 256*b*, and 356*b* receive the rotational forces of the transmission units 153, 253, and 353. Each of the second rotating portions 156*b*, 256*b*, and 356*b* may be formed in a cylindrical shape about the second rotation axis Ow2 as a whole.

The second eccentric portions 56 and 356 include second weight members 56*a* and 356*a* fixed to the second rotating portions 156*b*, 256*b*, and 356*b*. The second weight members 56*a* and 356*a* rotate integrally with the second rotating portion 156*b*, 256*b*, and 356*b*. The second weight members 56*a* and 356*a* are formed of a material having specific gravity larger than the second rotating portions 156*b*, 256*b*, and 356*b*.

The second weight members 56*a* and 356*a* are disposed on one side about the second rotation axis Ow2 to induce eccentric weight of the second eccentric portions 56 and 356. Each of the second weight members 56*a* and 356*a* may be formed in a column shape having a semi-circular bottom surface as a whole. The second weight members 56*a* and 356*a* may be disposed in an angle range within 180° about the second rotation axis Ow2 at an arbitrary time point during the rotations of the second eccentric portions 56 and 356. In the present embodiment, the second weight members 56*a* and 356*a* are disposed in a range of 180° about the second rotation axis Ow2, at an arbitrary time point described above.

The first rotating portions 155*b*, 255*b*, and 355*b* and the second rotating portions 156*b*, 256*b*, and 356*b* may be formed to have the same weight. The first weight members 55*a* and 355*a* and the second weight members 56*a* and 356*a* may be formed to have the same weight.

The vibration modules 50, 150, 250 and 350 include the hanger driving units 58 and 358 connecting the vibrating bodies 51 and 351 and the hanger body 31 to each other. The hanger driving units 58 and 358 are disposed in the vibrating bodies 51 and 351. The hanger driving units 58 and 358 are connected to the hanger body 31 at a position spaced apart from the central axis Oc. The hanger driving units 58 and 358 are preset to be connected to the external hanger body 31 at a position spaced apart from the central axis Oc. The hanger driving units 58 and 358 transmit vibrations of the vibrating bodies 51 and 351 to the hanger body 31.

The hanger driving units 58 and 358 transmit the vibrations of the vibrating bodies 51 and 351 to the hanger body 31 on the connection axis Oh. The hanger driving units 58 and 358 may include the protrusions 58*a* and 358*a* protruding along the connection axis Oh. The protrusions 58*a* and 358*a* protrude downward from the hanger driving units 58 and 358. The protrusions 58*a* and 358*a* protrude along the connection axis Oh. The hanger driving units 58 and 358 may include connecting rods 58*a* and 58*b* (358*a* and 358*b*) including the protrusions 58*a* and 358*a*. The connecting rods 58*a* and 58*b* (358*a* and 358*b*) may be configured as separate members. One end 58*a* and 358*a* of the connecting rods 58*a* and 58*b* (358*a* and 358*b*) may be inserted into the slit 31*bh* of the hanger driven unit 31*b*. The connecting rods 58*a* and 58*b* (358*a* and 358*b*) convert the rotational movements of the vibration modules 50, 150, 250, and 350 to reciprocate the hanger body 31 right and left.

The vibration modules 50, 150, 250, and 350 may include the motors 52 and 352 which generate the rotational forces of the first eccentric portions 55 and 355 and the second eccentric portions 56 and 356. The motors 52 and 352 are disposed in the vibrating bodies 51 and 351. The motors 52 and 352 include rotating motor shafts 52*a* and 352*a*. For example, each of the motors 52 and 352 include a rotor and a stator, and the motor shafts 52*a* and 352*a* can rotate integrally with the rotor. The motor shafts 52*a* and 352*a* transmit the rotational force to the transmission units 153, 253, and 353.

The vibration modules 50, 150, 250, and 350 may include the transmit units 153, 253, and 353 which respectively transmit the rotational forces of the motors 52 and 352 to the first eccentric portions 55 and 355 and the second eccentric portions 56 and 356. Each of the transmission units 153, 253, and 353 may include a gear, a belt, and/or a pulley.

The vibration modules 50, 150, 250, and 350 may include the weight shafts 54*a*, 54*b*, and 354 which provide functions of the first rotation axis Ow1 and the second rotation axis Ow2. The weight shafts 54*a*, 54*b*, and 354 can be fixed to the vibrating bodies 51 and 351. The weight shafts 54*a*, 54*b*, and 354 are disposed on the first rotation axis Ow1 and/or the second rotation axis Ow2. The weight shafts 54*a*, 54*b*, and 354 are disposed to penetrate the first eccentric portions 55 and 355 and/or the second eccentric portions 56 and 356.

The vibration modules 50, 150, 250, and 350 include elastic member engaging portions 59 and 359 with which one end of the elastic members 60 and 360 engages. The elastic member engaging portions 59 and 359 may be disposed in the vibrating bodies 51 and 351. The elastic member engaging portions 59 and 359 may press the elastic members 60 and 360 or receive elastic forces from the elastic members 60 and 360 during the movements of the vibration modules 50, 150, 250 and 350.

Hereinafter, an operation mechanism of each of the vibration modules 50, 150, 250, and 350 will be described with reference to FIGS. 2*a* to 3*d*.

The vibration directions +X and −X mean a preset direction to allow the hanger body 31 to reciprocate, and in the present embodiment, the right and left directions are preset to the vibration directions +X and −X.

In the present specification, the "central axis Oc, the first rotation axis Ow1, the second rotation axis Ow2, and the connection axis Oh" refer to virtual axes for explaining the present disclosure and do not refer to actual parts of the apparatus.

The central axis Oc means a virtual straight line which becomes a center of rotation of each of the vibration modules 50, 150, 250, and 350. The central axis Oc is a virtual straight line which maintains a fixed position relative to the frame 10. The central axis Oc may extend in an up-down direction.

In order to provide the function of the central axis Oc, as in the present embodiment, central shaft portions 75 and 375 protruding along the central axis Oc from the support member 70 are formed, and a central groove 51*h* or a central hole with which the central shaft portions 75 and 375 rotatably engage may be formed in the vibrating bodies 51 and 351. In order to provide the function of the central axis Oc, as another embodiment, a protrusion protruding along the central axis Oc is formed in the vibrating bodies 51 and 351, and a groove with which the protrusion rotatably engages may be formed in the support member 70.

The first rotation axis Ow1 means a virtual straight line which becomes a rotation center of each of the first eccentric portions 55 and 355. The first rotation axis Ow1 maintains a fixed position with respect to the vibrating bodies 51 and 351. That is, even if the vibrating bodies 51 and 351 move, the first rotation axis Ow1 moves integrally with the vibrating bodies 51 and 351 and maintains a relative position with respect to the vibrating bodies 51 and 351. The first rotation axis Ow1 may extend in the up-down direction.

In order to provide the function of the first rotation axis Ow1, the weight shafts 54*a* and 354 disposed on the first rotation axis Ow1 may be provided as in this embodiment. In order to provide the function of the first rotation axis Ow1, as another embodiment, protrusions formed along the first rotation axis Ow1 may be formed in any one of the first eccentric portions 55 and 355 and the vibrating bodies 51 and 351, and grooves with which the protrusions rotatably engage may be formed in the other thereof.

The second rotation axis Ow2 means a virtual straight line which becomes the rotation center of each of the second eccentric portions 56 and 356. The second rotation axis Ow2 maintains a fixed position with respect to the vibrating bodies 51 and 351. That is, even if the vibrating bodies 51 and 351 move, the second rotation axis Ow2 moves integrally with the vibrating bodies 51 and 351 and maintains a relative position with respect to the vibrating bodies 51 and 351. The second rotation axis Ow2 may extend in the up-down direction.

In order to provide the function of the second rotation axis Ow2, as in the present embodiment, the weight shafts 54*b* and 354 disposed on the second rotation axis Ow2 may be provided. However, as another embodiment, a protrusion protruding along the second rotation axis Ow2 is provided in one of the second eccentric portions 56 and 356 and the vibrating bodies 51 and 351, and a groove with which the protrusion rotatably engages may be formed in the other.

The connection axis Oh means a virtual straight line spaced apart from the central axis Oc. The connection axis Oh is disposed parallel to the central axis Oc. The connection axis Oh maintains a fixed position with respect to the vibrating bodies 51 and 351. That is, even if the vibrating bodies 51 and 351 move, the connection axis Oh moves integrally with the vibrating bodies 51 and 351 and maintains a relative position with respect to the vibrating bodies 51 and 351. The connection axis Oh may extend in the up-down direction. The portions 58*a* and 358*a* protruding along the connection axis Oh are formed at a connection point of the vibration modules 50, 150, 250, and 350 and the hanger body 31 so that rotation reciprocations of the vibration modules 50, 150, 250, and 350 are converted into a linear reciprocation of the hanger body 31.

A circumferential direction DI means a circumferential direction about the central axis Oc, and includes a clockwise direction DI1 and a counterclockwise direction DI2. The clockwise direction DI1 and the counterclockwise direction DI2 are defined based on a state viewed from one +Z of the extension directions +Z and −Z of the central axis Oc.

When a direction of a centrifugal force F1 with respect to the first rotation axis Ow1 according to the rotations of the first eccentric portions 55 and 355 is the circumferential direction DI, the centrifugal force F1 induces rotations of the vibrating bodies 51 and 351 with respect to the central axis Oc. In addition, when a direction of a centrifugal force F2 with respect to the second rotation axis Ow2 according to rotations of the second eccentric portions 56 and 356 is the circumferential direction DI, the centrifugal force F2 induces the rotations of the vibrating bodies 51 and 351 with respect to the central axis Oc.

A radial direction Dr means a direction intersecting the central axis Oc and includes a centrifugal direction Dr1 and a mesial direction Dr2. The centrifugal direction Dr1 means a direction away from the central axis Oc, and the mesial direction Dr2 means a direction closer to the central axis Oc.

When the direction of the centrifugal force F1 with respect to the first rotation axis Ow1 according to the rotations of the first eccentric portions 55 and 355 is the radial direction Dr, the centrifugal force F1 does not induce the rotations of the vibrating bodies 51 and 35 with respect to the central axis Oc. In addition, when the direction of the centrifugal force F2 with respect to the second rotation axis Ow2 according to the rotations of the second eccentric portions 56 and 356 is the radial direction Dr, the centrifugal force F2 does not induce the rotations of the vibrating bodies 51 and 351 with respect to the central axis Oc.

FIGS. 2*a* to 3*d* illustrate a center of gravity m1 of each of the first eccentric portions 55 and 355, a center of gravity m2 of each of the second eccentric portions 56 and 356, a rotation radius r1 of the center of gravity m1 with respect to the first rotation axis Ow1, a rotation radius r2 of the center of gravity m2 with respect to the second rotation axis Ow2, an angular speed w of each of the first eccentric portions 55 and 355 about the first rotation axis Ow1, an angular speed w of each of the second eccentric portions 56 and 356 about the second rotation axis Ow2, a distance A1 between the center axis Oc and the first rotation axis Ow1, a distance A2 between the central axis Oc and the second rotation axis Ow2, and a distance B between the central axis Oc and the connection axis Oh.

Moreover, FIGS. 2*a* to 3*d* illustrate the direction of the centrifugal force F1 of the first eccentric portions 55 and 355 with respect to the first rotation axis Ow1 and the direction of the centrifugal force F2 of each of the second eccentric portions 56 and 356 with respect to the second rotation axis Ow2. A combined force of the centrifugal force F1 and the centrifugal force F2 is the rotational force of each of the vibrating bodies 51 and 351. The exciting force Fo is the combined force of the centrifugal force F1 and the centrifugal force F2 expressed by an external force having an action point on the connection axis Oh in consideration of moment arm lengths A1, A2, and B.

A magnitude of the centrifugal force F1 is $m1 \cdot r1 \cdot w^2$, and a magnitude of the centrifugal force F2 is $m2 \cdot r2 \cdot w^2$. The centrifugal force F1 and the centrifugal force F2 are applied to the vibrating bodies 51 and 351, and the action points of the centrifugal force F1 and centrifugal force F2 are located at the first rotation axis Ow1 and the second rotation axis Ow2, respectively.

Referring to FIGS. 2*a*, 2*c*, 3*a*, and 3*c*, when the centrifugal force F1 and the centrifugal force F2 are provided to be reinforced with each other when the rotational forces of the vibrating bodies 51 and 351 about the central axis Oc are generated. When the weights of the first eccentric portions 55 and 355 are eccentric to the first rotation axis Ow1 in one direction D1 of the clockwise direction DI1 and the counterclockwise direction D12 based on the central axis Oc, the weights of the second eccentric portions 56 and 356 are provided to be eccentric to the second rotation axis Ow2 in the one direction D1. When the first eccentric portions 55 and 355 generate the centrifugal force with respect to the first rotation axis Ow1 in the one direction D1 of the clockwise direction DI1 and the counterclockwise direction D12 based on the central axis Oc, the second eccentric portions 56 and 356 are provided to generate the centrifugal force with respect to the second rotation axis Ow2 in the one direction D1. In this case, a moment (A1·F1+A2·F2) by the centrifugal force F1 and the centrifugal force F2 is equivalent to a moment (B·Fo) by the exciting force Fo, Fo is $$\left(\frac{A1}{B} \cdot F1 + \frac{A2}{B} \cdot F2\right)$$

With reference to FIGS. 2*b*, 2*d*, 3*b*, and 3*d*, the centrifugal force F1 and the centrifugal force F2 are provided to have directions opposite to each other when the vibrating bodies 51 and 351 do not generate the rotational force about the central axis Oc. When the weights of the first eccentric portions 55 and 355 are eccentric with respect to the first rotation axis Ow1 in one direction D2 of the centrifugal direction Dr1 and the mesial direction Dr2 based on the central axis Oc, the weights of the second eccentric portions 56 and 356 are provided to be eccentric with respect to the second rotation axis Ow2 in a direction opposite to the one direction D2. When the first eccentric portions 55 and 355 generate the centrifugal force with respect to the first rotation axis Ow1 in one direction D2 of the centrifugal direction Dr1 and the mesial direction Dr2 based on the central axis Oc, the second eccentric portions 56 and 356 are provided to generate the centrifugal force with respect to the second rotation axis Ow2 in the direction opposite to the one direction D2.

The centrifugal force F1 and the centrifugal force F2 are provided to cancel each other when the rotation forces of the vibrating bodies 51 and 351 are not generated. In this case, application directions of the centrifugal force F1 and the centrifugal force F2 are opposite to each other, a magnitude of the combined force of the centrifugal force F1 and the centrifugal force F2 is equal to a difference value between the magnitude of the centrifugal force F1 and the magnitude of the centrifugal force F2. Accordingly, at least one of the centrifugal force F1 and the centrifugal force F2 is canceled by the other.

The vibration modules 50, 150, 250, and 350 are rotated to move the hanger body 31, the centrifugal force F1 and the centrifugal force F2 which induce the rotations of the vibration modules 50, 150, 250, and 350 in the circumferential direction D1 are reinforced with each other to generate vibrations in the predetermined vibration directions +X and −X, the centrifugal force F1 and the centrifugal force F2 which do not induce the rotations of the vibration modules 50, 150, 250, and 350 in the radial direction Dr cancel each other and suppress the generation of the vibrations in the vertical directions +Y and −Y in the vibration directions +X and −X of the hanger body 31.

Preferably, when the rotational forces of the vibrating bodies 51 and 351 are not generated, the centrifugal force F1 and the centrifugal force F2 may be provided to completely cancel each other. Here, the "complete cancellation" means that the combined force of the centrifugal force F1 and the centrifugal force F2 is 0. Accordingly, it is possible to minimize occurrences of the unnecessary vibrations in the directions +Y and −Y perpendicular to the predetermined vibration directions +X and −X.

In order to completely cancel the centrifugal force F1 and the centrifugal force F2 in the radial direction D4 to each other, a scalar quantity m1·r1 and a scalar quantity m2·r2 may be provided to cancel each other.

(i) The rotation radius r1 with respect to the first rotation axis Ow1 of the center of gravity of the first eccentric portions 55 and 355 and (ii) the rotation radius r1 with respect to the second rotation axis Ow2 of the center of gravity of the second eccentric portions 56 and 356 may provided to be same as each other (r1=r2). The weight m1 of the first eccentric portions 55 and 355 and the weight m2 of the second eccentric portions 56 and 356 may be provided to be same as each other (m1=m2). The centrifugal force F1 and the centrifugal force F2 in the radial direction Dr can be completely cancelled each other by the two settings (r1=r2, m1=m2). Of course, even if the rotation radius r1 and the rotation radius r2 are different from each other and the weight m1 and the weight m2 are different from each other, m1·r1 and m2·r2 may be provided to be same as each other so that the centrifugal force F1 and the centrifugal force F2 in the radial direction Dr can completely cancel each other.

(i) The distance A1 between the first rotation axis Ow1 and the central axis Oc and (ii) the distance A2 between the second rotation axis Ow2 and the central axis Oc may be provided to be same as each other. Accordingly, ratios of the centrifugal force F1 and the centrifugal force contributing the generation of the exciting force Fo may be the same as each other so that a fatigue load is prevented be concentrated on one of a portion supporting the first eccentric portions 55 and 355 and a portion supporting the second eccentric portions 56 and 356.

The first rotation axis Ow1 and the second rotation axis Ow2 may be spaced apart from the central axis Oc in the same direction or opposite directions. The central axis Oc, the first rotation axis Ow1, and the second rotation axis Ow2 are disposed to vertically intersect one virtual line. In the first and second embodiments, the first rotation axis Ow1 and the second rotation axis Ow2 are spaced apart from the central axis Oc in directions opposite to each other, and in the third embodiment, the first rotation axis Ow1 and the second rotation axis are spaced apart from the central axis Oc in the same direction as each other. Accordingly, it is possible to cancel the centrifugal force F1 and the centrifugal force F2 in the radial direction Dr each other.

(i) An angular speed w about the first rotation axis Ow1 of the first eccentric portions 55 and 355 and (ii) an angular speed w about the second rotation axis Ow2 of the second eccentric portions 56 and 356 may be preset to be same as each other. Accordingly, it is possible to periodically reinforce and cancel the centrifugal forces F1 and F2 according to the rotation of the first eccentric portions 55 and 355 and the second eccentric portions 56 and 356.

Here, the angular speed refers to a scalar which does not have a direction of rotation and only have a size, and is different from an angular velocity which is a vector having a direction and a size of rotation. That is, the angular speed w of the first eccentric portions 55 and 355 and the angular speed w of the second eccentric portions 56 and 356 being the same as each other does not includes the rotation directions thereof being the same as each other. For example, although the angular speed w of the first eccentric portions 55 and 355 and the angular speed w of the second eccentric portions 56 and 356 are the same as each other, as in the first and second embodiments (refer to FIGS. 2a to 2d), the first eccentric portions 55 and 355 and the second eccentric portions 56 and 356 may be rotated in the same direction to each other, and as in the third embodiment (refer to FIGS. 3a to 3d), the first eccentric portion 55 and the second eccentric portions 56 and, 356 may rotate in rotation directions opposite to each other.

Hereinafter, operation mechanisms of the vibration modules 150 and 250 according to the first and second embodiments will be described with reference to FIGS. 2a to 2d as follows. Here, the first rotation axis Ow1 and the second rotation axis Ow2 are different from each other. A rotation direction around the first rotation axis Ow1 of the first eccentric portion 55 and a rotation direction around the second rotation axis Ow2 of the second eccentric portion 56 are the same as each other. The hanger driving unit 58 is fixed to the vibrating body 51 and rotates integrally with the vibrating body 51.

In the first and second embodiments, the first rotation axis Ow1 and the second rotation axis Ow2 are spaced apart from the central axis Oc in directions opposite to each other. In addition, the first rotation axis Ow1 and the second rotation axis Ow2 may be disposed symmetrically to each other about the central axis Oc. Accordingly, it is possible to prevent the vibrating body 51 from being eccentric to one side based on the central axis (Oc) due to the weights m1 and m2 of the first and second eccentric portions 55 and 56.

Figure 2A:
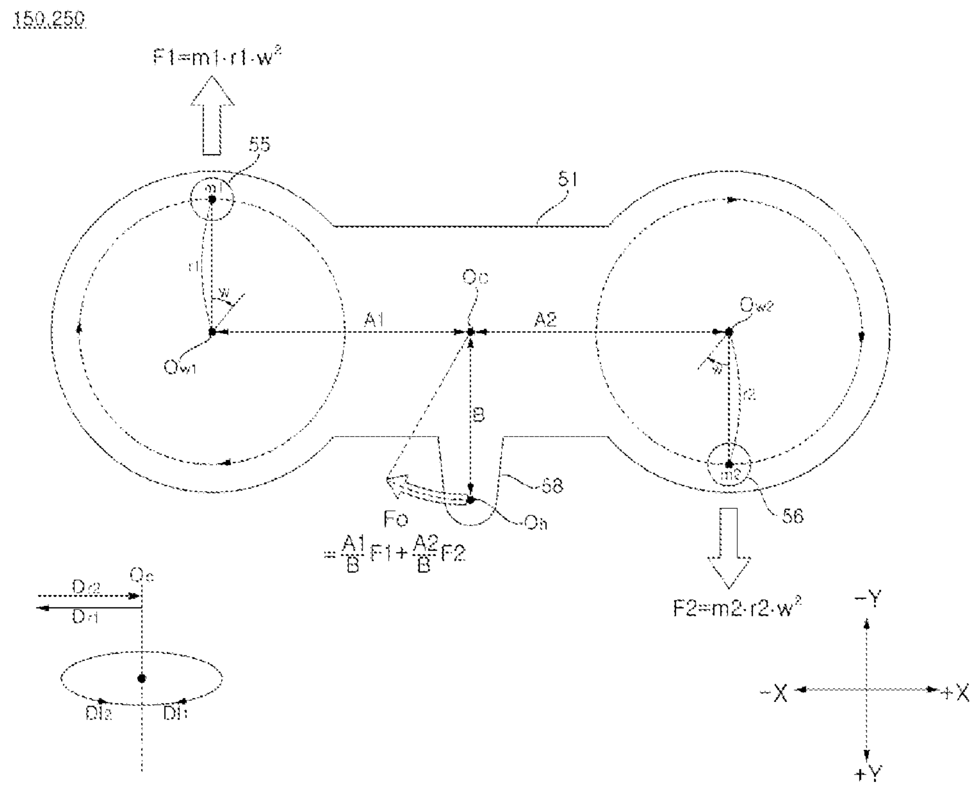
Figure 2B:
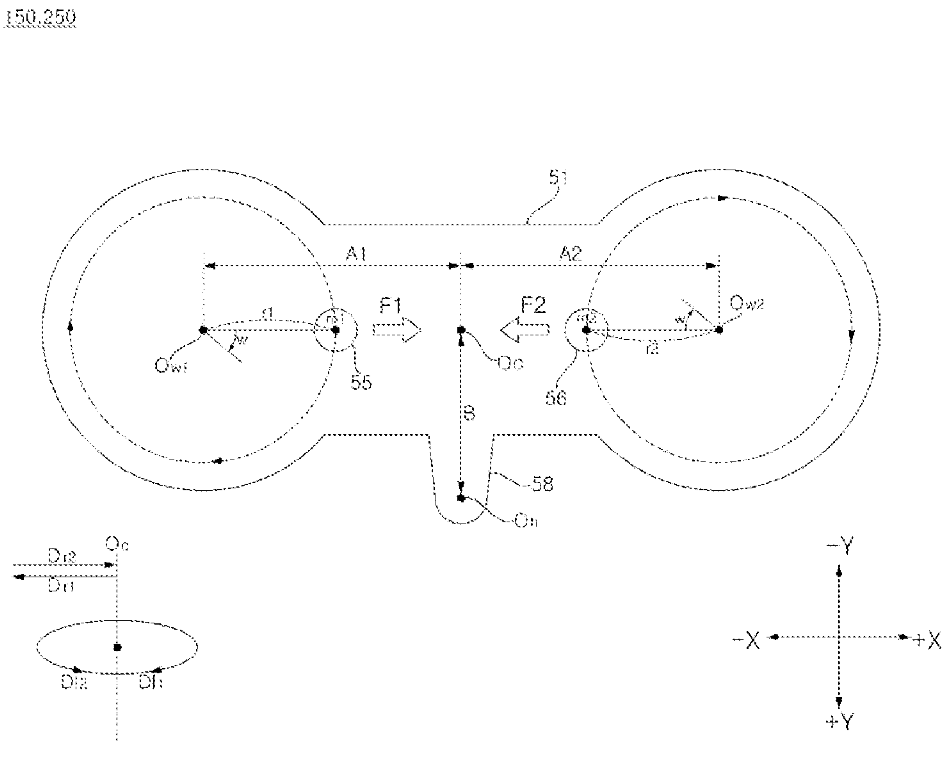
Figure 2C:
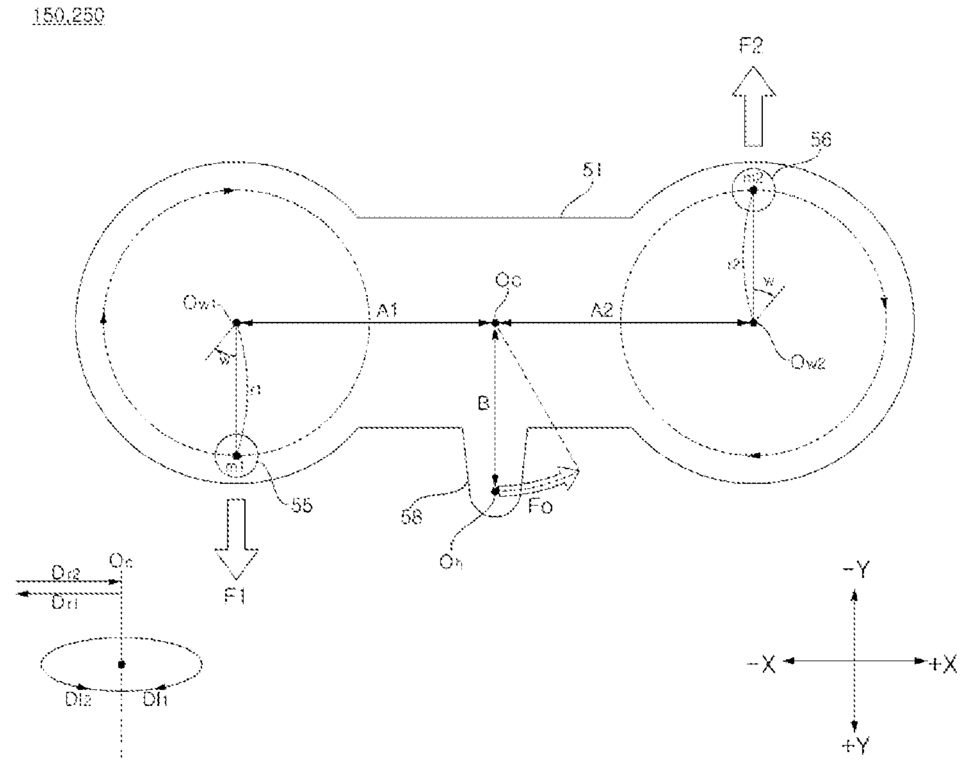
Figure 2D:
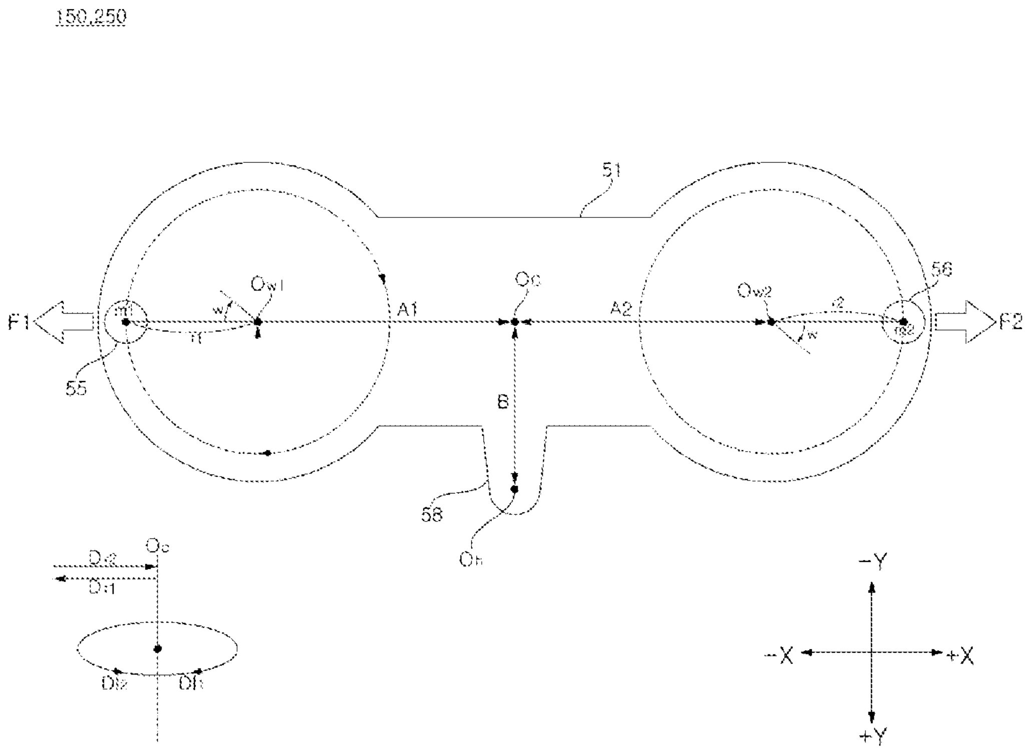

Referring to FIGS. 2b and 2d, when the centrifugal force F1 of the first eccentric portion 55 and the centrifugal force F2 of the second eccentric portion 56 cancel each other, application directions of the centrifugal force F1 and the centrifugal force F2 are the centrifugal direction Dr1 or the mesial direction Dr2.

FIGS. 2a to 2d illustrate a state of each moment when the first eccentric portion 55 and the second eccentric portion 56 rotating in the same angular speed w are rotated by 90°.

Referring to FIG. 2a, when the first eccentric portion 55 generates the centrifugal force F1 with respect to the first rotation axis Ow1 in the clockwise direction DI1, the second eccentric portion 56 generates the centrifugal force F2 with respect to the second rotation axis Ow2 in the clockwise direction DI1. Accordingly, the centrifugal force F1 and the centrifugal force F2 are reinforced with each other to generate the rotation force in the clockwise direction of the vibrating body 51. The exciting force Fo transmitted to the hanger body 31 on the connection axis Oh is applied in the clockwise direction DI1.

Referring to FIG. 2b, when the first eccentric portion 55 generates the centrifugal force F1 with respect to the first rotation axis Ow1 in the mesial direction Dr2, the second eccentric portion 56 generates a centrifugal force with respect to the second rotation axis Ow2 in the mesial direction Dr2. Accordingly, the centrifugal force F1 and the centrifugal force F2 do not generate the rotational force of the vibrating body 51. The exciting force Fo transmitted to the hanger body 31 on the connection axis Oh becomes 0. In addition, the centrifugal force F1 and the centrifugal force F2 are applied in the directions opposite to each other and cancel each other.

Referring to FIG. 2*c*, when the first eccentric portion 55 generates the centrifugal force F1 with respect to the first rotation axis Ow1 in the counterclockwise direction DI2, the second eccentric portion 56 generates a centrifugal force F2 with respect to the second rotation axis Ow2 in the counterclockwise direction DI2. Accordingly, the centrifugal force F1 and the centrifugal force F2 are reinforced with each other to generate the rotational force of the vibrating body 51 in the counterclockwise direction DI2. The exciting force Fo transmitted to the hanger body 31 on the connection axis Oh is applied in the counterclockwise direction DI2.

Referring to FIG. 2*d*, when the first eccentric portion 55 generates a centrifugal force F1 with respect to the first rotation axis Ow1 in the centrifugal direction Dr1, the second eccentric portion 56 generates the centrifugal force with respect to the second rotation axis Ow2 in the centrifugal direction Dr1. Accordingly, the centrifugal force F1 and the centrifugal force F2 do not generate the rotational force of the vibrating body 51. The exciting force Fo transmitted to the hanger body 31 on the connection axis Oh becomes zero. In addition, the centrifugal force F1 and the centrifugal force F2 are applied in the directions opposite to each other and cancel each other.

Hereinafter, an operation mechanism of the vibration module 350 according to the third embodiment will be described with reference to FIGS. 3*a* to 3*d*. Here, the first rotation axis Ow1 and the second rotation axis Ow2 are the same as each other. The rotation direction around the first rotation axis Ow1 of the first eccentric portion 355 and the rotation direction around the second rotation axis Ow2 of the second eccentric portion 356 are opposite to each other. The hanger driving unit 358 is fixed to the vibrating body 351, and rotates integrally with the vibrating body 351.

In the third embodiment, the first rotation axis Ow1 and the second rotation axis Ow2 are spaced apart from the central axis Oc in the same direction.

Figure 3A:
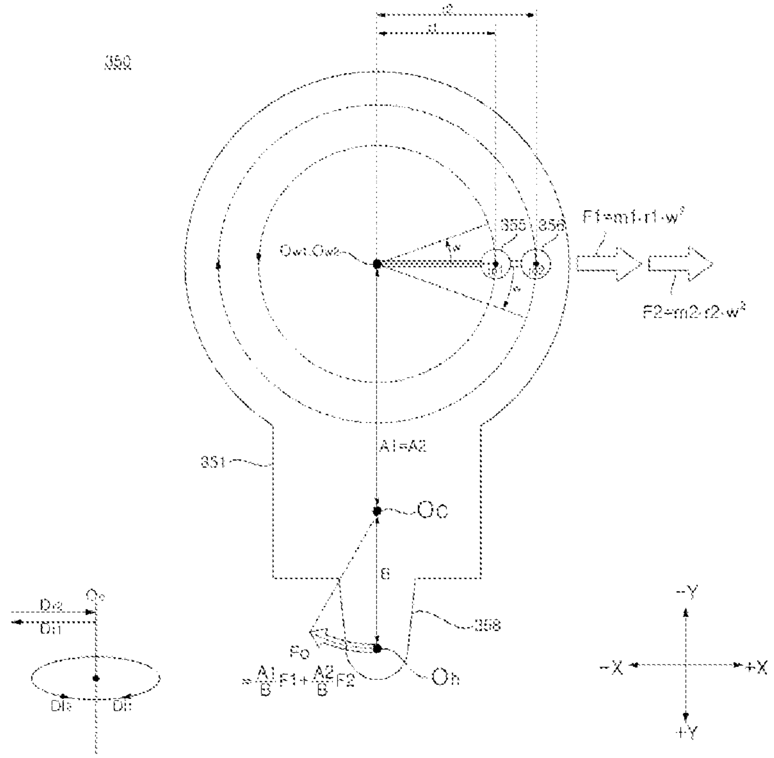
Figure 3B:
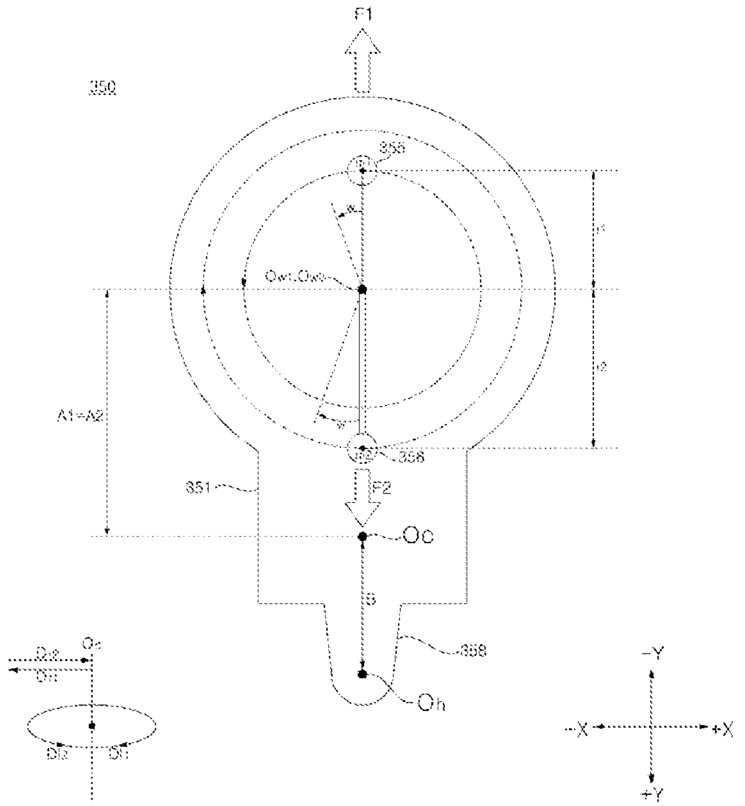
Figure 3C:
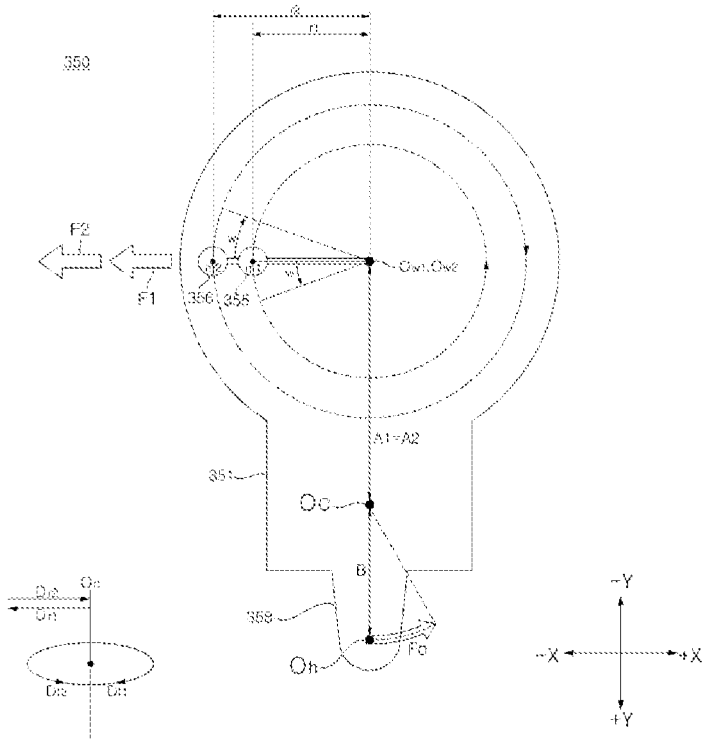
Figure 3D:
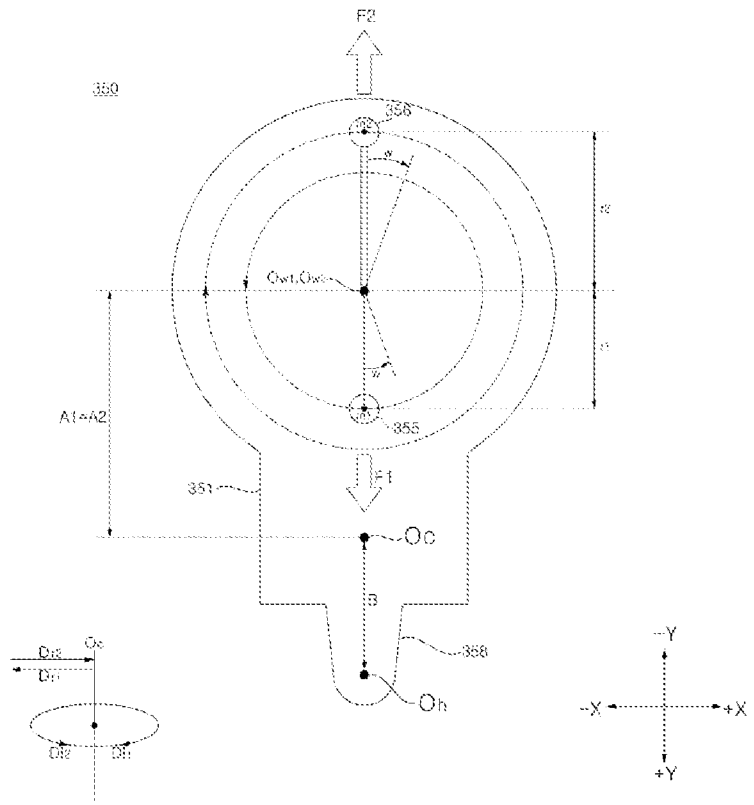
Figure 4:
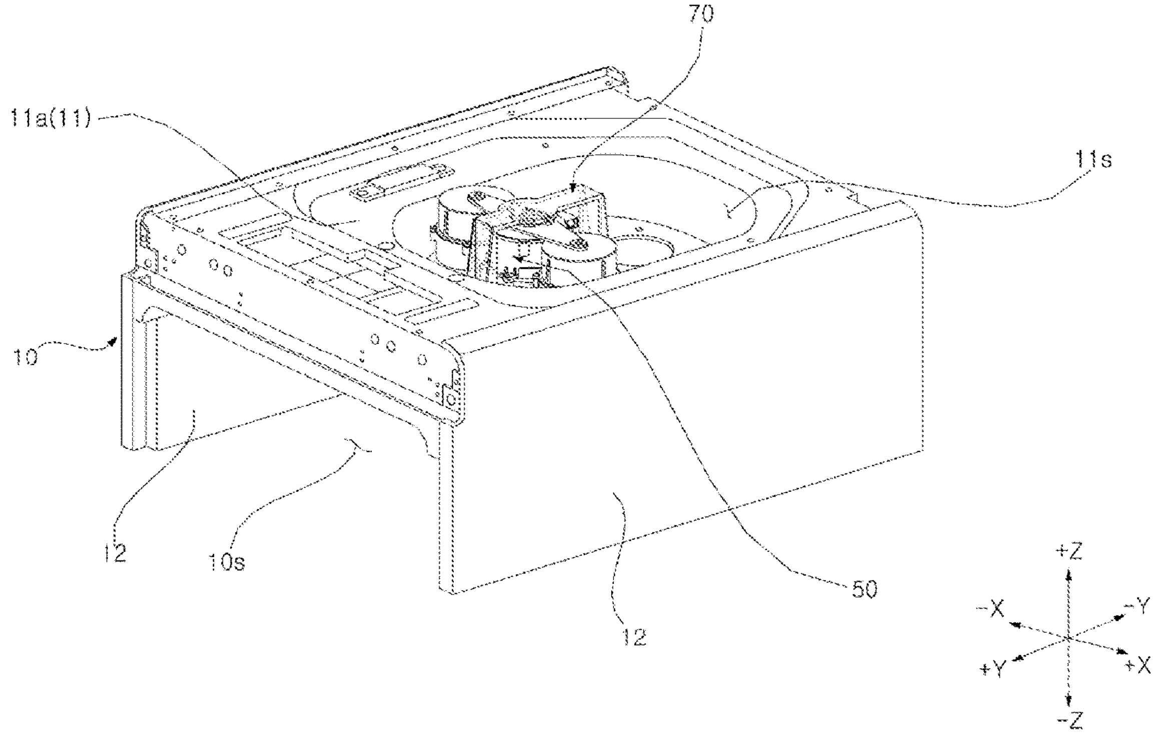
FIG. 4 is a perspective view illustrating the vibration module 50 according to the first and second embodiments, a support member 70, and a hanger module 30 disposed in a frame 10 of FIG. 1, and is a view illustrating a state where an outer frame is excluded.
Figure 5:
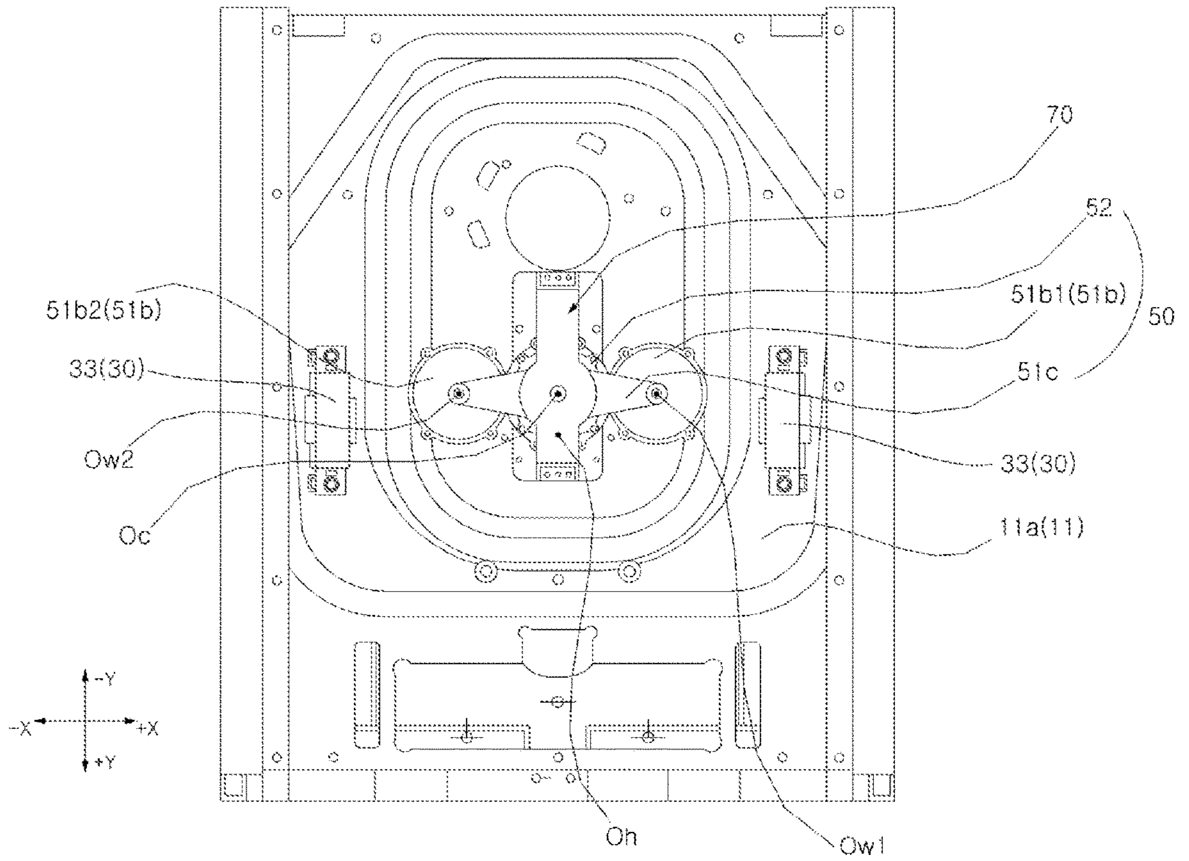
FIG. 5 is an upper elevation view illustrating the frame of FIG. 4, the vibration module 50 according to the first and second embodiments, the support member 70, and the hanger module 30.
Figure 6:
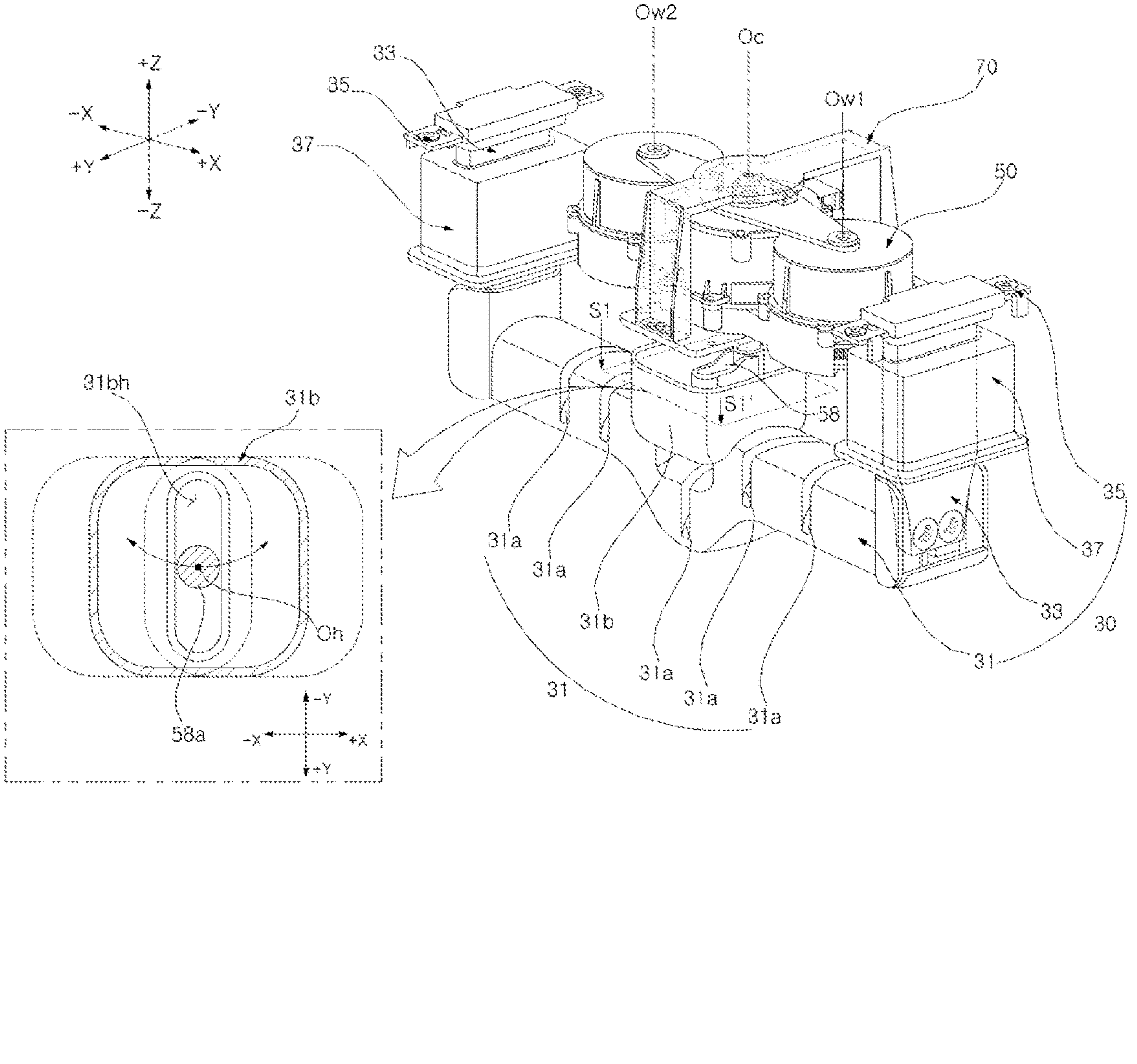
FIG. 6 is a perspective view illustrating the vibration module 50, the support member 70, and the hanger module 30 of FIG. 4, and is a partial cross-sectional view when a hanger driving unit 58 and a hanger driven unit 31*b* are horizontally taken along line S1-S1'.
Figure 7:
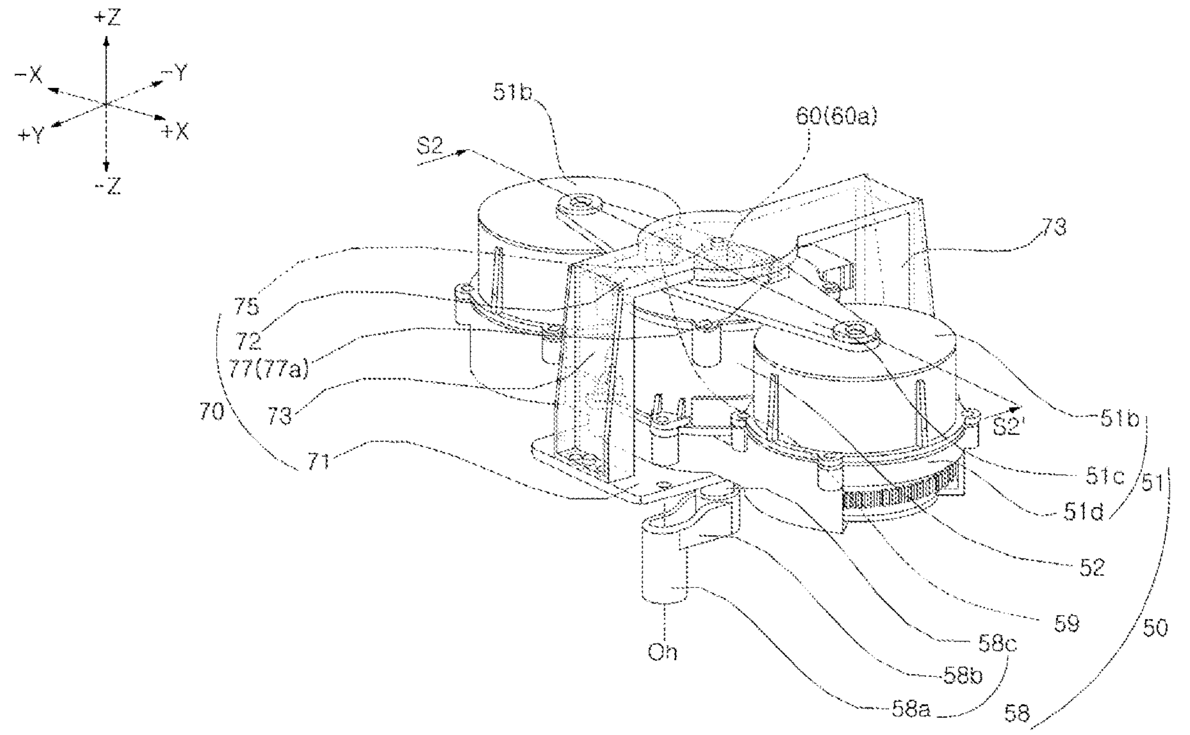
FIG. 7 is a perspective view illustrating a state where the vibration module 50 according to the first and second embodiments, an elastic member 60, and the support member 70 of FIG. 6 are coupled to each other.

Referring FIGS. 3*b* and 3*d*, when the centrifugal force F1 of the first eccentric portion 55 and the centrifugal force F2 of the second eccentric portion 56 cancel each other, one of the application directions of the centrifugal force F1 and the centrifugal force F2 is the centrifugal direction Dr1 and the other is the mesial direction Dr2.

FIGS. 3*a* to 3*d* illustrate a state of each moment when the first eccentric portion 55 and the second eccentric portion 56 rotating in the same angular speed w are rotated by 90°.

Referring to FIG. 3*a*, when the first eccentric portion 55 generates the centrifugal force F1 with respect to the first rotation axis Ow1 in the clockwise direction DI1, the second eccentric portion 56 generates the centrifugal force F2 with respect to the second rotation axis Ow2 in the clockwise direction DI1. Accordingly, the centrifugal force F1 and the centrifugal force F2 are reinforced with each other to generate the rotation force in the clockwise direction of the vibrating body 51. The exciting force Fo transmitted to the hanger body 31 on the connection axis Oh is applied in the clockwise direction DI1.

Referring to FIG. 3*b*, when the first eccentric portion 55 generates the centrifugal force F1 with respect to the first rotation axis Ow1 in the centrifugal direction Dr1, the second eccentric portion 56 generates the centrifugal force with respect to the second rotation axis Ow2 in the mesial direction Dr2. Accordingly, the centrifugal force F1 and the centrifugal force F2 do not generate the rotational force of the vibrating body 51. The exciting force Fo transmitted to the hanger body 31 on the connection axis Oh becomes 0. In addition, the centrifugal force F1 and the centrifugal force F2 are applied in the directions opposite to each other and are cancel each other.

Referring to FIG. 3*c*, when the first eccentric portion 55 generates the centrifugal force F1 with respect to the first rotation axis Ow1 in the counterclockwise direction DI2, the second eccentric portion 56 generates the centrifugal force F2 with respect to the second rotation axis Ow2 in the counterclockwise direction DI2. Accordingly, the centrifugal force F1 and the centrifugal force F2 are reinforced with each other to generate the rotational force of the vibrating body 51 in the counterclockwise direction DI2. The exciting force Fo transmitted to the hanger body 31 on the connection axis Oh is applied in the counterclockwise direction DI2.

Referring to FIG. 3*d*, when the first eccentric portion 55 generates the centrifugal force F1 with respect to the first rotation axis Ow1 in the mesial direction Dr2, the second eccentric portion 56 generates the centrifugal force with respect to the second rotation axis Ow2 in the centrifugal direction Dr1. Accordingly, the centrifugal force F1 and the centrifugal force F2 do not generate the rotational force of the vibrating body 51. The exciting force Fo transmitted to the hanger body 31 on the connection axis Oh becomes zero. In addition, the centrifugal force F1 and the centrifugal force F2 are applied in the directions opposite to each other and cancel each other.

Hereinafter, configurations of the vibration modules 50, 150, 250, the elastic member 60, and the support member 70 according to the first and second embodiments will be described in more detail with reference to FIGS. 4 to 13 as follows.

The vibrating body 51 may include a weight casing 51*b* accommodating the first eccentric portion 55 and the second eccentric portion 56 therein. The weight casing 51*b* may form an outer shape of an upper portion of the vibration module 50. The upper ends of the weight shafts 54*a* and 54*b* are fixed to the weight casing 51*b*. The weight casing 51*b* includes a first part 51*b*1 covering the upper portions of the first eccentric portions 155 and 255, and a second part 51*b*2 covering the upper portions of the second eccentric portions 156 and 256. An upper end of the first weight shaft 54*a* is fixed to the first part 51*b*1. An upper end of the second weight shaft 54*b* is fixed to the second part 51*b*2.

The vibrating body 51 may include a base casing 51*d* forming an outer shape of the lower portion. Lower ends of the weight shafts 54*a* and 54*b* are fixed to the base casing 51*d*. The first eccentric portions 155 and 255 and the second eccentric portions 156 and 256 are disposed between the weight casing 51*b* and the base casing 51*d*. The first eccentric portions 155 and 255 are disposed between the first part 51*b*1 and the base casing 51*d*. The second eccentric portions 156 and 256 are disposed between the second part 51*b*2 and the base casing 51*d*.

The vibrating body 51 may include a motor support portion 51*e* which supports the motor 52. The motor support portion 51*e* may support a lower end of the motor 52. The motor support portion 51*e* is disposed between the first part 51*b*1 and the second part 51*b*2. The motor shaft 52*a* may be disposed through the motor support portion 51*e*. The motor support portion 51*e* may be fixed to the weight casing 51*b*, and may be integrally formed with the weight casing 51*b*.

The vibrating body 51 may include an elastic member mount 51*c* with which one end of at least one elastic member 60*a* engages. The elastic member mount 51*c* may be disposed on the upper portion of the vibrating body 51. The elastic member mount 51*c* may be fixed to the upper ends of the first part **51*b*1 and the second part 51*b*2. The elastic member mount 51*c* may be disposed across the central axis Oc. The central shaft portion 75 may be disposed to penetrate the elastic member mount 51*c***.

The vibrating body 51 may form the central groove **51*h* or the central hole into which the central shaft portion 75 is inserted. The central groove 51*h* may be formed an upper side and/or a lower side of the vibrating body 51. In the present embodiment, the central groove 51*h* is formed in the elastic member mount 51*c*. A bearing B1 is disposed in the central groove 51*h* so that the vibrating body 51 can be rotatably supported by the central shaft portion 75**.

The motor 52 may be disposed on the central axis Oc. The motor 52 is disposed between the first eccentric portions 155 and 255 and the second eccentric portions 156 and 256. The motor 52 has a motor shaft **52*a* disposed on the central axis Oc. The motor shaft 52*a* protrudes downward and is connected to the transmission units 153 and 253. Accordingly, it is possible to prevent eccentricity toward one side due to the weight of the motor 52** about the central axis Oc.

The transmission units 153 and 253 include center transmission units **153*c* and 253*c* which rotate integrally with the motor shaft 52*a*. The center transmission units 153*c* and 253*c* may be fixed to the motor shaft 52*a*. The transmission units 153 and 253 may include first transmission units 153*a* and 253*a* including gears or belts which transmit the rotational forces of the center transmission units 153*c* and 253*c* to the first eccentric portions 155 and 255. The transmission units 153 and 253 may include second transmission units 153*b* and 253*b* including gears or belts which transmit the rotational forces of the center transmission units 153*c* and 253*c* to the second eccentric portions 156 and 256**.

The first weight shaft **54*a* and the second weight shaft 54*b* are formed as separate members. The first weight shaft 54*a* is disposed on the first rotation axis Ow1. The second weight shaft 54*b* is disposed on the second rotation axis Ow2. The first weight shaft 54*a* and the second weight shaft 54*b* are disposed in directions opposite to each other based on the central axis Oc. The first weight shaft 54*a* and the second weight shaft 54*b* are symmetrically disposed based on the central axis Oc. The first weight shaft 54*a* and the second weight shaft 54*b* are fixed to the vibrating body 51. The first weight shaft 54*a* is disposed to penetrate the first rotating portions 155*b* and 255*b*. The second weight shaft 54*b* is disposed to penetrate the second rotating portions 156*b* and 256*b***.

The first eccentric portions 155 and 255 and the second eccentric portions 156 and 256 are disposed in the directions opposite to each other based on the central axis Oc. The first eccentric portions 155 and 255 and the second eccentric portions 156 and 256 may be disposed to face each other horizontally. The first eccentric portions 155 and 255 may be disposed on one side +X of the vibration directions +X and −X, and the second eccentric portions 156 and 256 may be disposed on the other side −X.

The first eccentric portions 155 and 255 may include the first weight member **55*a* and the first rotating portions 155*b* and 255*b*. The first rotating portions 155*b* and 255*b* may include a central portion 55*b*1 rotatably contacting the first weight shaft 54*a*. The first weight shaft 54*a* is disposed to penetrate the central portion 55*b*1. The central portion 55*b*1 extends along the first rotation axis Ow1. The central portion 55*b*1 forms a central hole along the first rotation axis Ow1. The central portion 55*b*1** may be formed in a pipe shape.

The first rotating portions **155*b* and 255*b* may include a peripheral portion 55*b*2 seated on the central portion 55*b*1. The central portion 55*b*1 is disposed to penetrate the peripheral portion 55*b*2. The peripheral portion 55*b*2 may be formed in a cylindrical shape extending along the first rotation axis Ow1 as a whole. A seating groove 55*b*3 on which the first weight member 55*a* is seated may be formed in the peripheral portion 55*b*2. The seating groove 55*b*3 may be formed such that an upper side thereof is open. A side surface in the centrifugal direction of the seating groove 55*b*3 based on the first rotation axis Ow1 may be formed to be blocked. The peripheral portion 55*b*2 and the first weight member 55*a*** rotate integrally with each other.

The second eccentric portions 156 and 256 may include a second weight member **56*a* and second rotating portions 156*b* and 256*b*. The second rotating portions 156*b* and 256*b* may include a central portion 56*b*1 rotatably contacting the second weight shaft 54*a*. The second weight shaft 54*a* is disposed to penetrate the central portion 56*b*1. The central portion 56*b*1 extends along the second rotation axis Ow2. The central portion 56*b*1 forms a central hole along the second rotation axis Ow2. The central portion 56*b*1** may be formed in a pipe shape.

The second rotating portions **156*b* and 256*b* may include a peripheral portion 56*b*2 seated on the central portion 56*b*1. The central portion 56*b*1 is disposed to penetrate the peripheral portion 56*b*2. The peripheral portion 56*b*2 may be formed in a cylindrical shape extending along the second rotation axis Ow2 as a whole. The peripheral portion 56*b*2 may have a seating groove 56*b*3 on which the second weight member 56*a* is seated. The seating groove 56*b*3 may be formed such that an upper side thereof is open. A side surface of the seating groove 56*b*3 in the centrifugal direction based on the second rotation axis Ow2 may be formed to be blocked. The peripheral portion 56*b*2 and the second weight member 56*a*** rotate integrally with each other.

The hanger driving unit 58 includes a rotating protrusion **58*c* fixed to the vibrating body 51. An upper end of the rotating protrusion 58*c* may be fixed to a lower portion of the vibrating body 51. The rotating protrusion 58*c* rotates integrally with the vibrating body 51. The rotation protrusion 58*c* is disposed to penetrate a lower support portion 71 along the central axis Oc. A bearing B2 is interposed between the rotation protrusion 58*c* and the lower support portion 71, and thus, the rotating protrusion 58*c* can be rotatably supported by the lower support portion 71. The rotating protrusion 58*c* can transmit the rotational force of the vibrating body 51 to the connecting rods 58*a* and 58*b***.

The hanger driving unit 58 includes the connecting rods **58*a* and 58*b* which transmit the rotational force of the vibration module 50 to the hanger body 31. The connecting rods 58*a* and 58*b* are fixed to the rotating protrusion 58*c*, and rotate integrally with the rotating protrusion 58*c*. The connecting rods 58*a* and 58*b* may be fixed to the lower end of the rotating projection 58*c*. The connecting rods 58*a* and 58*b* include a centrifugal extension portion 58*b* extending in the centrifugal direction Dr1 from the rotating projection 58*c*. A distal end of the centrifugal extension portion 58*b* in the mesial direction Dr2 is fixed to the rotational projection 58*c*. The connecting rods 58*a* and 58*b* include the protrusion 58*a* protruding along the connection axis Oh. The protrusion 58*a* may protrude downward from the distal end of the centrifugal extension portion 58*b* in the centrifugal direction Dr1**.

The vibration module 50 includes an elastic member engaging portion 59 with which one end of the elastic member 60 engages. When the vibration module 50 rotates about the central axis Oc, the elastic member 60 is elastically deformed by the elastic member engaging portion 59, or a resilient force of the elastic member 60 is transmitted to the elastic member engaging portion 59. The elastic member engaging portion 59 may be disposed to be fixed to the vibrating body 51.

The elastic member engaging portion 59 may include a first engaging portion 59*a* with which one end of the first elastic member 60*a* engages. The first engaging portion 59*a* may be formed on an upper side of the elastic member mount 51*c*. The elastic member engaging portion 59 may include a second engaging portion (not illustrated) with which one end of the second elastic member 60*b* engages. The second catching portion is formed on a lower side of the base casing 51*d*. The elastic member engaging portion 59 may include a third engaging portion (not illustrated) with which one end of the third elastic member 60*c* engages. The third catching portion may be formed on the connecting rods 58*a* and 58*b*.

The elastic member 60 may be disposed between the vibration module 50 and the support member 70. One end of the elastic member 60 is engaged by the vibration module 50 and the other end thereof is engaged by the elastic member seating portion 77 of the support member 70. The elastic member 60 may include a torsion spring.

A plurality of elastic members 60*a*, 60*b*, and 60*c* may be provided. Each of the elastic member 60*a*, 60*b*, and 60*c* is provided to be elastically deformed when the vibration module 50 rotates in one of the clockwise direction DI1 and the counterclockwise direction and elastically restored when the vibration module 50 rotates in the other direction.

The first elastic member 60*a* is disposed above the vibration module 50. One end of the first elastic member 60*a* may be engaged by the first engaging portion 59*a*, and the other end thereof may be engaged by the first seating portion 77*a* of the support member 70. The first elastic member 60*a* may include a torsion spring disposed around the central shaft portion 75.

The second elastic member 60*b* is disposed below the vibration module 50. One end of the second elastic member 60*b* may be engaged by the second engaging portion of the vibration module 50, and the other end thereof may be engaged by the second seating portion 77*b* of the support member 70. The second elastic member 60*b* may include a torsion spring disposed around the rotation protrusion 58*c*.

The third elastic member 60*c* is disposed on a lower side of the lower support portion 71. The third elastic member 60*c* may be disposed between the lower support portion 71 and the connecting rods 58*a* and 58*b*. One end of the third elastic member 60*c* may be engaged by the third engaging portion of the vibration module 50, and the other end thereof may be engaged by a third seating portion (not illustrated) of the support member 70.

The support member 70 includes a lower support portion 71 disposed below the vibrating body 51. The lower support portion 71 may be formed in a horizontal plate shape. The lower support portion 71 has a hole formed on the central axis Oc, through which the rotating projection 58*c* penetrates. A bearing B2 is disposed in the hole of the lower support portion 71 so that the rotation protrusion 58*c* is rotatably supported.

The support member 70 includes an upper support portion 72 disposed above the vibrating body 51. The upper support portion 72 may be formed in a horizontal plate shape. The support member 70 includes a central shaft portion 75 protruding along the central axis Oc from the upper support portion 72. The central shaft portion 75 may protrude downward from a lower surface of the upper support portion 72. A lower end of the central shaft portion 75 is inserted into the central groove 51*h* of the vibrating body 51. The central shaft portion 75 rotatably supports the vibrating body 51 through the bearing B1.

The support member 70 includes the lower support portion 71 and a vertical extension portion 73 which extend to be connected to the upper support portion 72. The vertical extension portions 73 extend in the up-down direction. A pair of vertical extension portions 73 may be disposed on both ends of the upper support portion 72. The upper support portion 72 may be fixed to the lower support portion 71 by the vertical extension portions 73.

The support member 70 includes the elastic member seating portion 77 with which one end of the elastic member 60 engages. The first seating portion 77*a* is fixed to a lower surface of the upper supporting portion 72. The second seating portion 77*b* is disposed to be fixed to an upper surface of the lower support portion 71. The third seating portion is disposed to be fixed to the lower surface of the lower support portion 71.

The vibration module 50 can be modularized to be manufactured. The vibration module 50 manufactured may be assembled together with the support member 70 and the elastic member 60. The support member 70 may include the lower part 71 and the upper parts 72 and 73.

Figure 8:
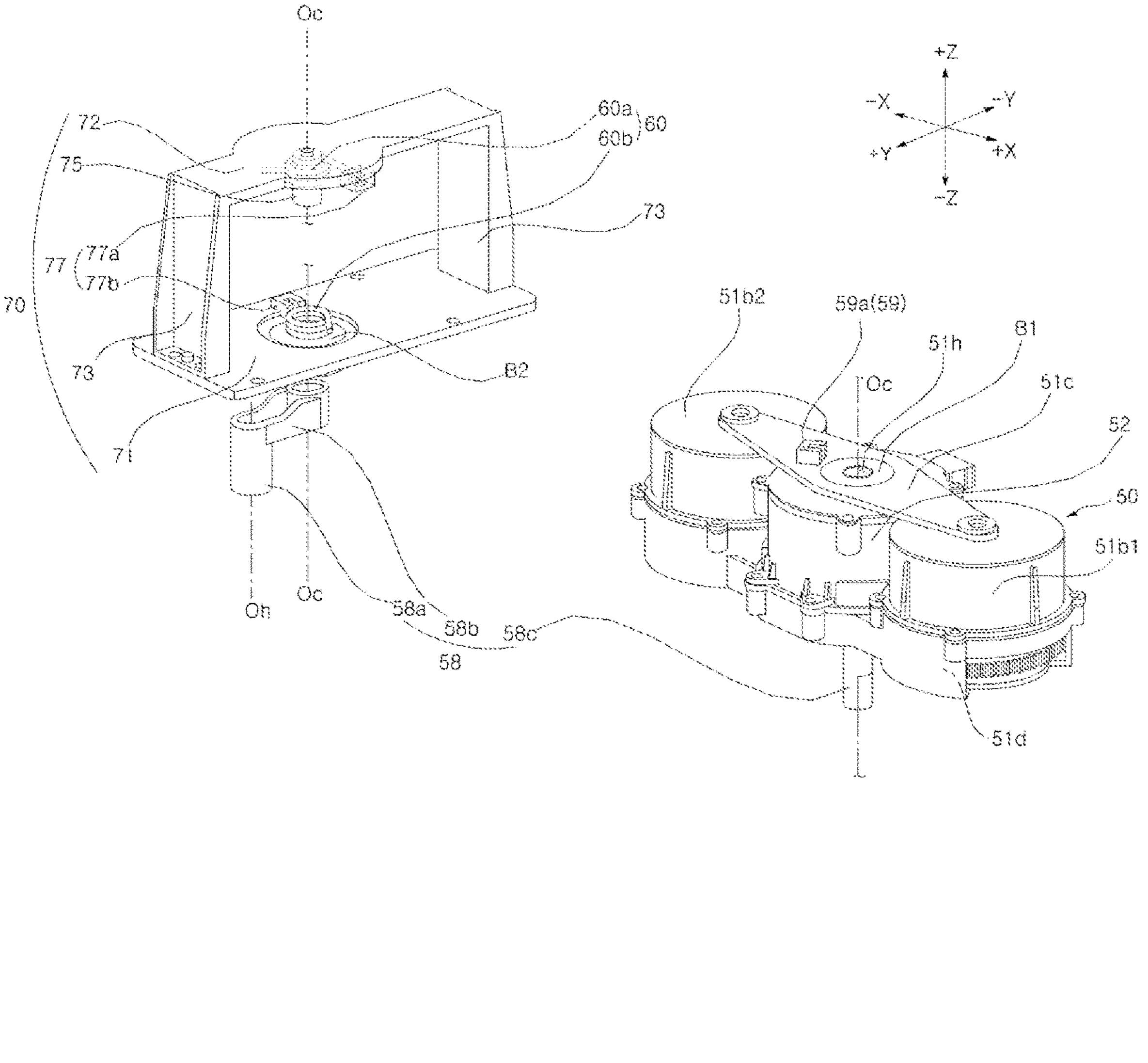
FIG. 8 is a perspective view illustrating a state where the vibration module 50 according to the first and second embodiments, the elastic member 60, and the support member 70 of FIG. 7 are separated from each other.

Referring to FIG. 8, an assembly process of the modularized vibration module 50 and other parts will be described as follows. First, the elastic member 60*b* is assembled to the seating portion 77*b* disposed on an upper surface of the lower part 71, and the elastic member 60*a* is assembled to the elastic member engaging portion 59*a* disposed on the upper side of the vibration module 50. Thereafter, the upper parts 72 and 73 and the lower parts 71 are disposed on the upper and lower sides of the vibration module 50, and the upper parts 72 and 73 and the lower part 71 are fastened to each other. In this case, the elastic member 60*a* is assembled to the seating portion 77*a* disposed on the lower surfaces of the upper parts 72 and 73, and the elastic member 60*b* is assembled to an elastic member engaging portion (not illustrated) disposed on the lower surface of the vibration module 50.

Figure 9:
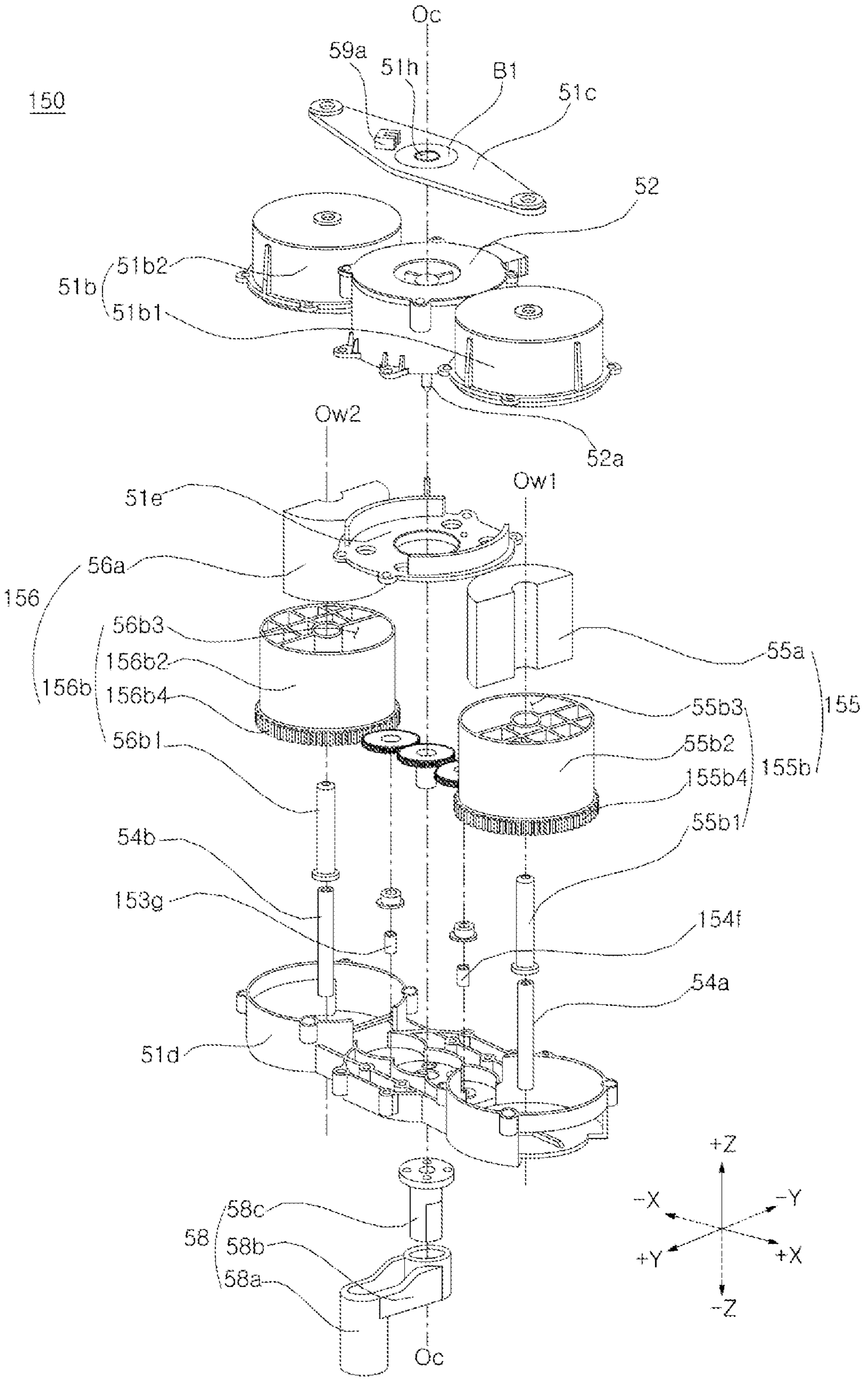
FIG. 9 is an exploded perspective view illustrating a vibration module 150 according to the first embodiment of FIG. 8.
Figure 10:
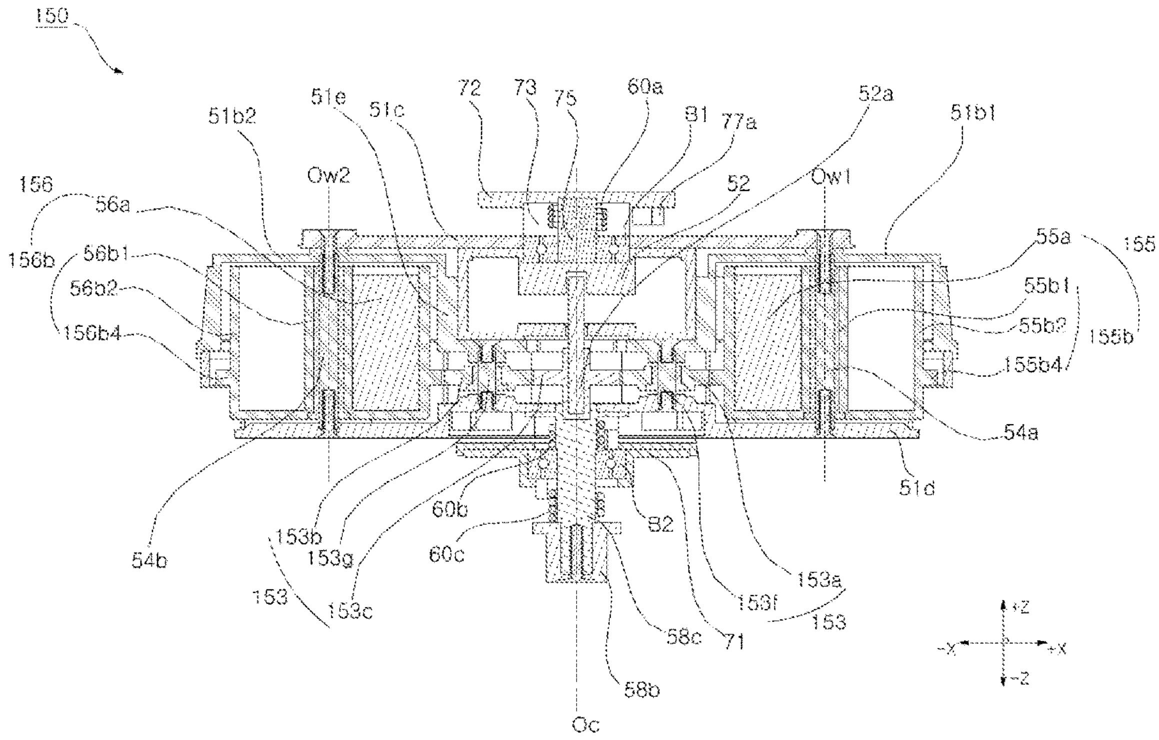
FIG. 10 is a cross-sectional view when the vibration module 150 according to the first embodiment, the elastic member 60, and the support member 70 are vertically taken along line S2-S2'.

Hereinafter, the vibration module 150 according to the first embodiment will be described in more detail with reference to FIGS. 9 to 11.

The transmission unit 153 according to the first embodiment includes the gear-type center transmission unit 153*c*. The central axis Oc may be provided across the center of the center transmission unit 153*c*. The center transmission unit 153*c* may include a spur gear. The transmission unit 153 may include the first transmission unit 153*a* which rotates in engagement with the center transmission unit 153*c*. The first transmission unit 153*a* may include a spur gear. The transmission unit 153 may include a second transmission unit 153*b* which rotates in engagement with the center transmission unit 153*c*. The second transmission unit 153*b* may include a spur gear.

The transmission unit 153 includes a first transmission shaft 153*f* which provides a function of a rotation shaft of the first transmission unit 153*a*. The first transmission shaft 153*f* may be fixed to the vibrating body 51. Moreover, the transmission unit 153 includes a second transmission axis 153*g* which provides a function of a rotation shaft of the second transmission unit 153*b*. The second transmission shaft 153*g* may be fixed to the vibrating body 51.

The first eccentric portion 155 according to the first embodiment includes a tooth portion 155*b*4 which engages with the first transmission unit 153*a* and receives a rotational force. The toothed portion 155*b*4 are formed along a circumference of the peripheral portion 55*b*2. The rotational force of the motor shaft 52*a* is sequentially transmitted to the toothed portion 155*b*4 through the center transmission unit 153*c* and the first transmission unit 153*a*.

The second eccentric portion 156 according to the first embodiment includes a toothed portion 156*b*4 which engages with the second transmission unit 153*b* and receives a rotational force. The toothed portion 156*b*4 are formed along a circumference of the peripheral portion 56*b*2. The rotational force of the motor shaft 52*a* is sequentially transmitted to the toothed portion 156*b*4 through the center transmission unit 153*c* and the second transmission unit 153*b*.

Figure 11:
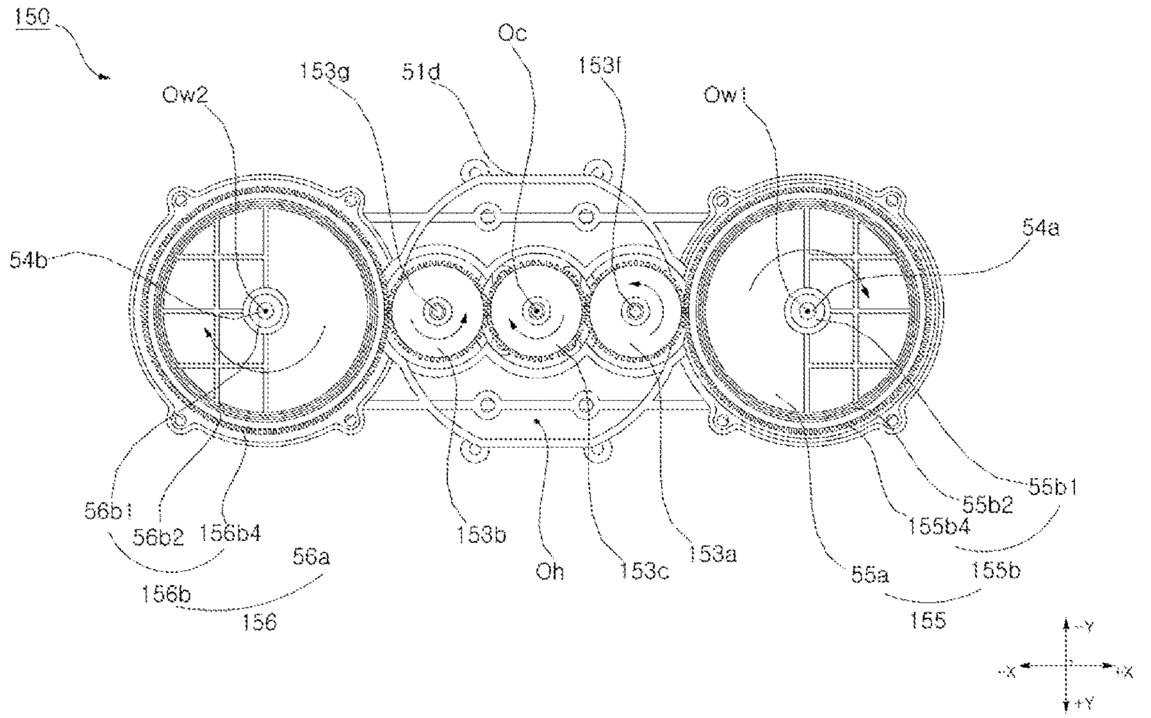
FIG. 11 is an elevation view when a transmission unit 153, a first eccentric portion 155, and a second eccentric portion 156 of FIG. 10 are viewed from above.

For example, in FIG. 11, when the center transmission unit 153*c* rotates in the clockwise direction, the first transmission unit 153*a* and the second transmission unit 153*b* rotate in the counterclockwise direction, and the first eccentric portion 155 and the second eccentric portion 156 rotates in the clockwise direction. In FIG. 11, positions of the central axis Oc, the first rotation axis Ow1, the second rotation axis Ow2, and the connection axis Oh are illustrated.

Figure 12:
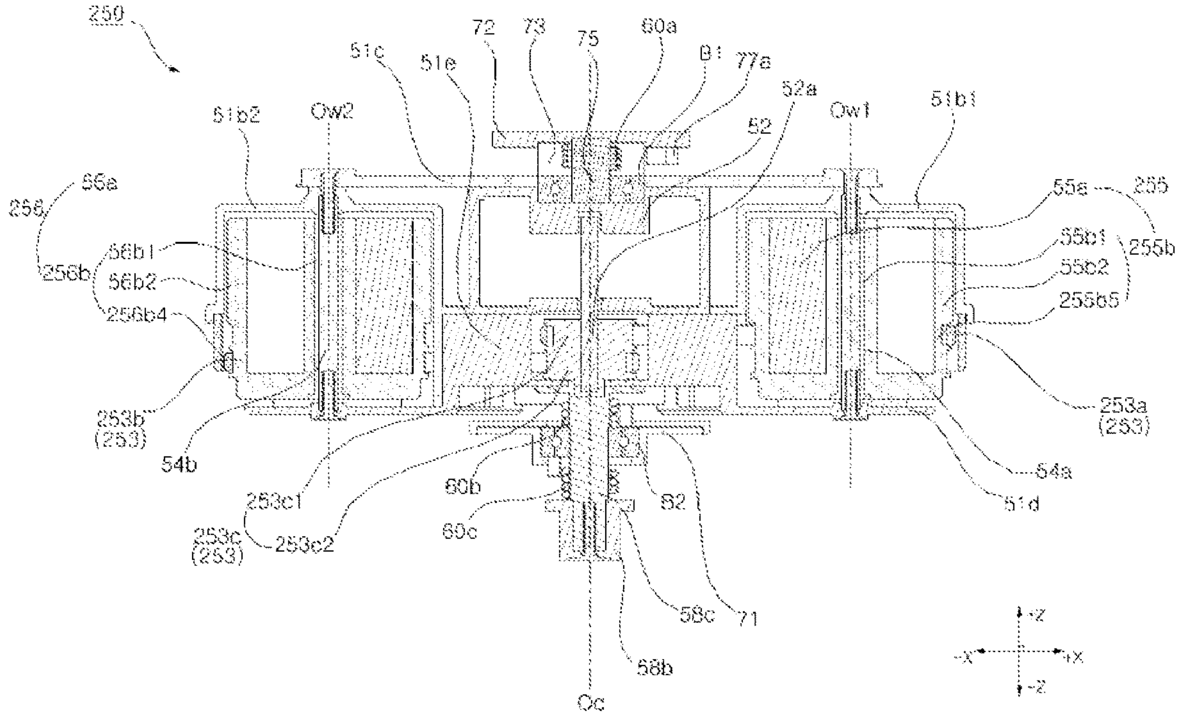
FIG. 12 is a cross-sectional view when a vibration module 250 according to the second embodiment, the elastic member 60, and the support member 70 are vertically taken along line S2-S2' of FIG. 7.

Hereinafter, referring to FIGS. 12 and 13, the vibration module 250 according to the second embodiment will be described with reference to differences from the first embodiment.

The transmission unit 253 according to the second embodiment includes a pulley-type center transmission unit 253*c*. The central axis Oc may be provided across the center of the center transmission unit 253*c*. The transmission unit 253 may include the first transmission unit 253*a* wound and rotated around the center transmission unit 253*c*. The first transmission unit 253*a* may include a belt. The transmission unit 253 may include a second transmission unit 253*b* wound and rotated around the center transmission unit 253*c*. The second transmission unit 253*b* may include a belt.

The center transmission unit 253*c* includes a first pulley portion 253*c*1 around which the first transmission unit 253*a* is wound, and a second pulley portion 253*c*2 around which the second transmission unit 253*b* is wound. The first pulley portion 253*c*1 and the second pulley portion 253*c*2 may be arranged vertically.

The first eccentric portion 255 according to the second embodiment includes a pulley portion 255*b*5 which is wound by the first transmission unit 253*a* and receives a rotational force. The pulley portion 255*b*5 is formed along a circumference of the peripheral portion 55*b*2. The rotational force of the motor shaft 52*a* is sequentially transmitted to the pulley portion 255*b*4 through the center transmission unit 253*c* and the first transmission unit 253*a*.

The second eccentric portion 256 according to the second embodiment includes a pulley portion 256*b*5 which is wound by the second transmission unit 253*a* and receives a rotational force. The pulley portion 256*b*5 is formed along a circumference of the peripheral portion 56*b*2. The rotational force of the motor shaft 52*a* is sequentially transmitted to the pulley portion 256*b*4 through the center transmission unit 253*c* and the second transmission unit 253*a*.

Figure 13:
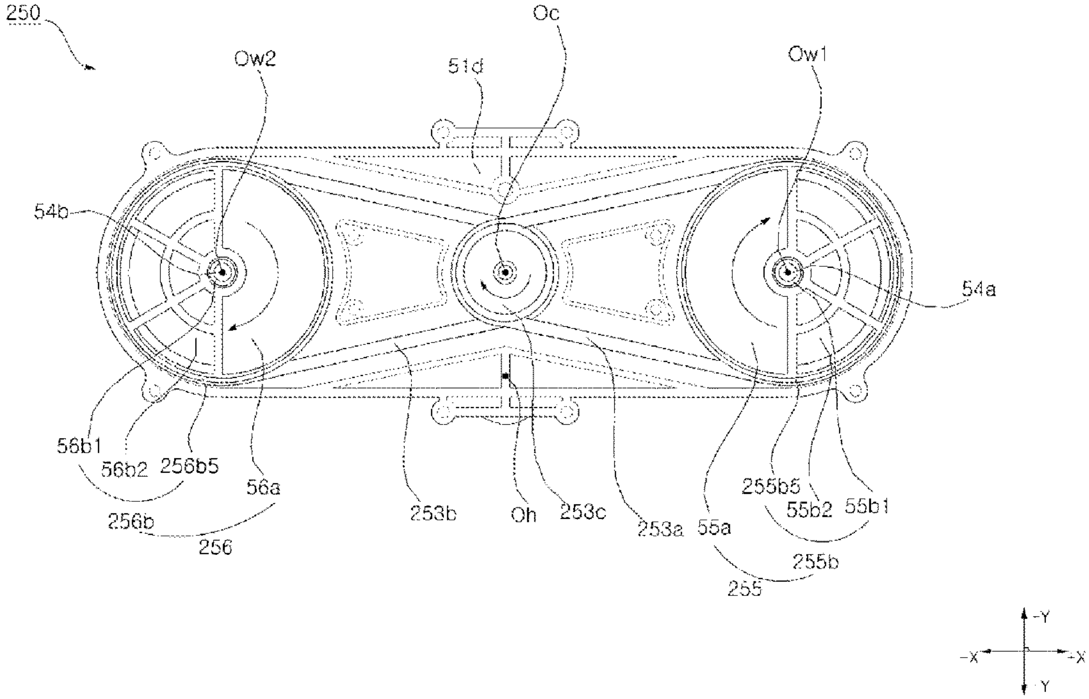
FIG. 13 is an elevation view when a transmission unit 253, a first eccentric portion 255, and a second eccentric portion 256 of FIG. 10 are viewed from above.
Figure 14:
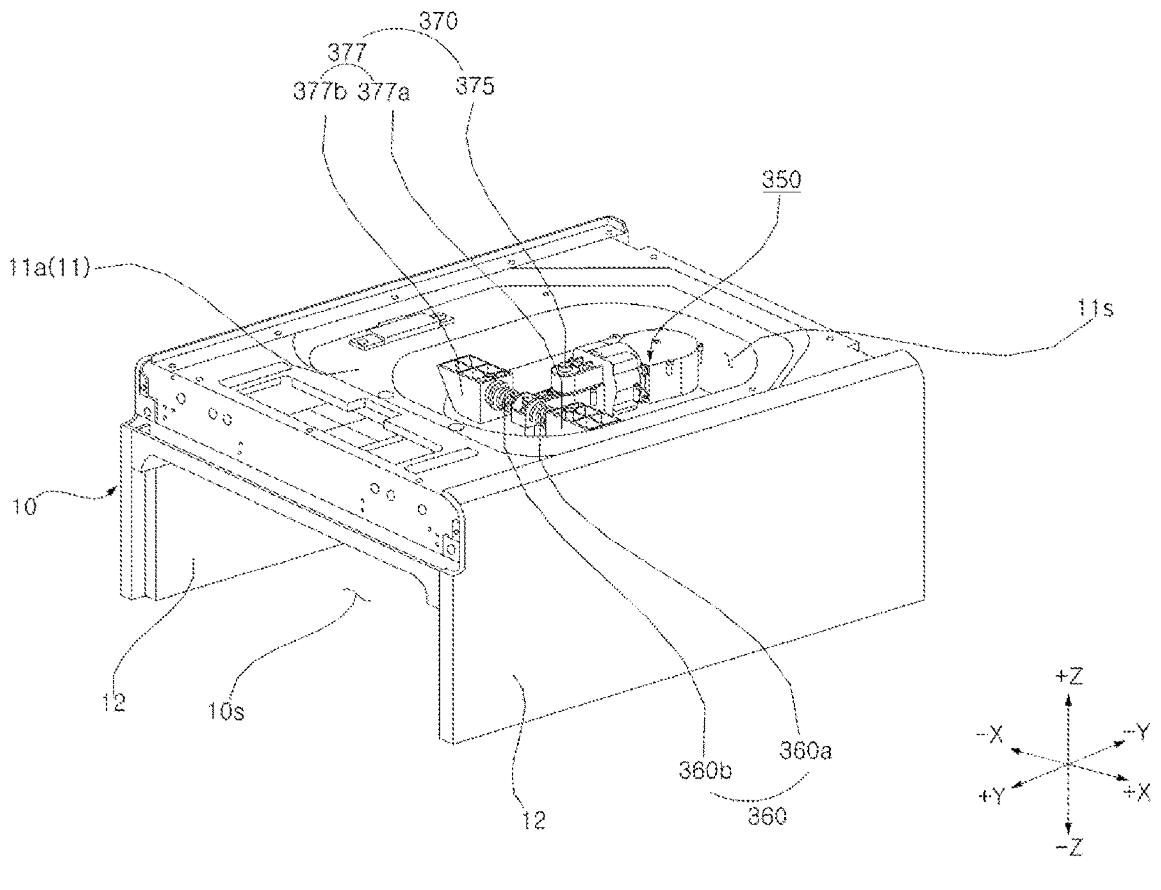
FIG. 14 is a partial perspective view illustrating a vibration module 350 according to a third embodiment, a support member 370, and the hanger module 30 disposed in the frame 10 of FIG. 1, and a view illustrating a state where an outer frame 11*b* is excluded.
Figure 15:
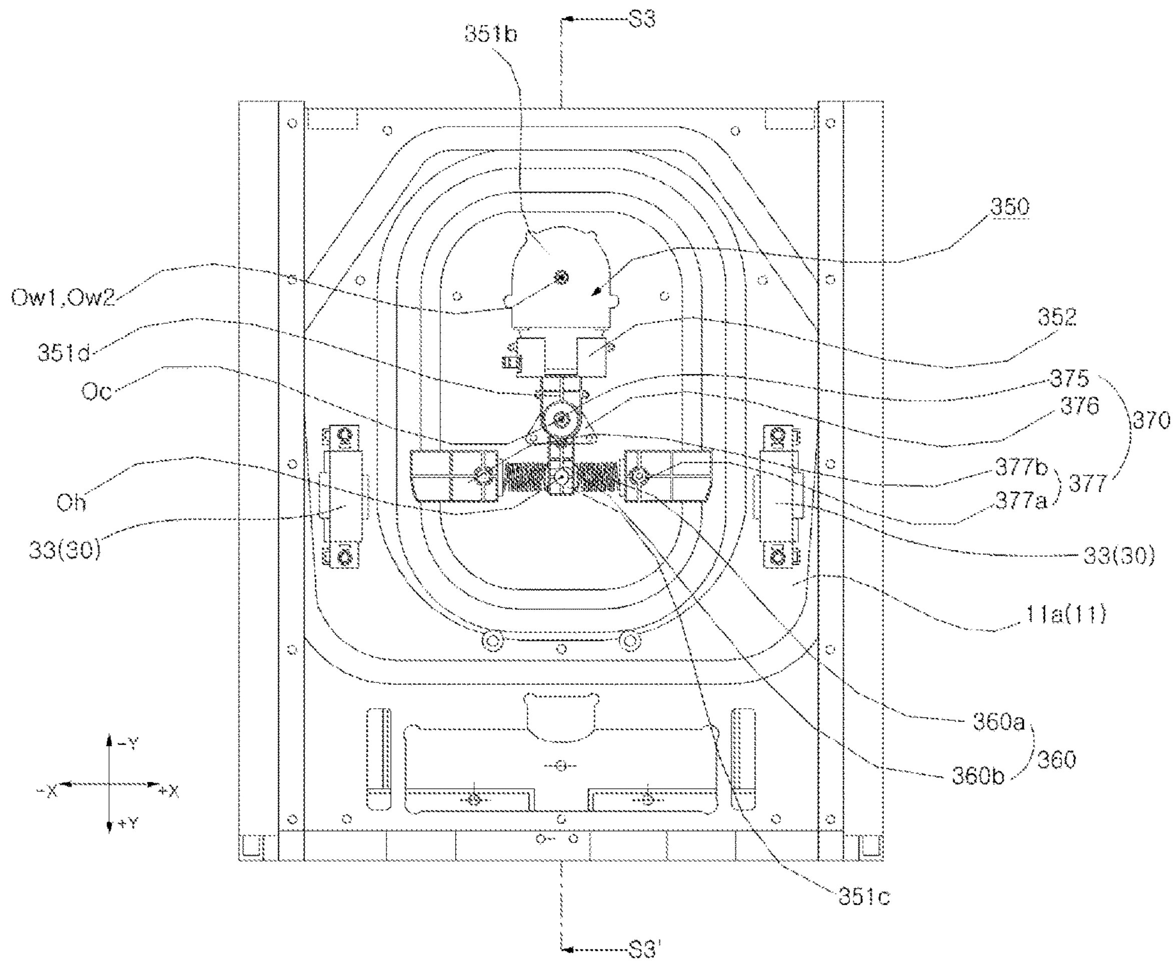
FIG. 15 is an upper elevation view illustrating the frame 10, the vibration module 350 according to the third embodiment, the support member 370, and the hanger module 30 of FIG. 14.
Figure 16:
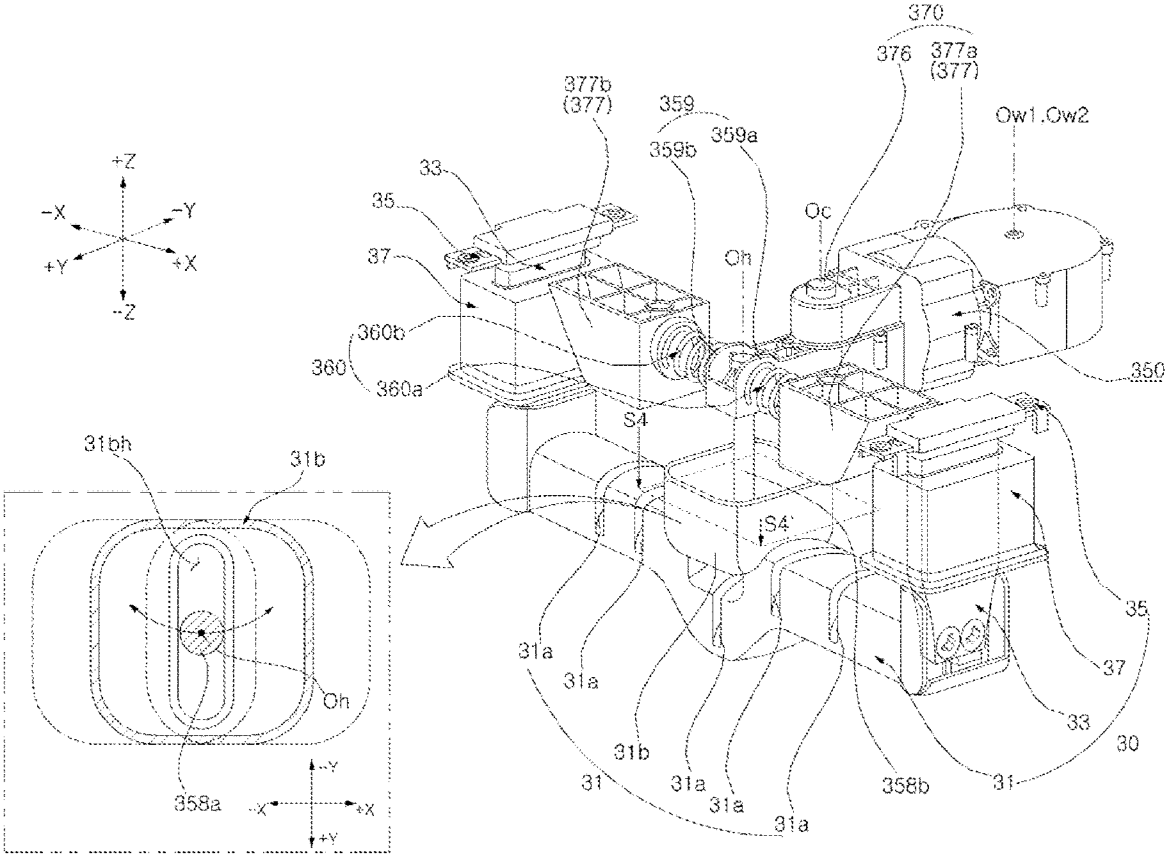
FIG. 16 is a perspective view illustrating the vibration module 350 according to the third embodiment, the support member 370, and the hanger module 30 of FIG. 14, and a partial cross-sectional view when a hanger driving unit 358 and a hanger driven unit 31*b* are horizontally taken along line S4-S4'.
Figure 17:
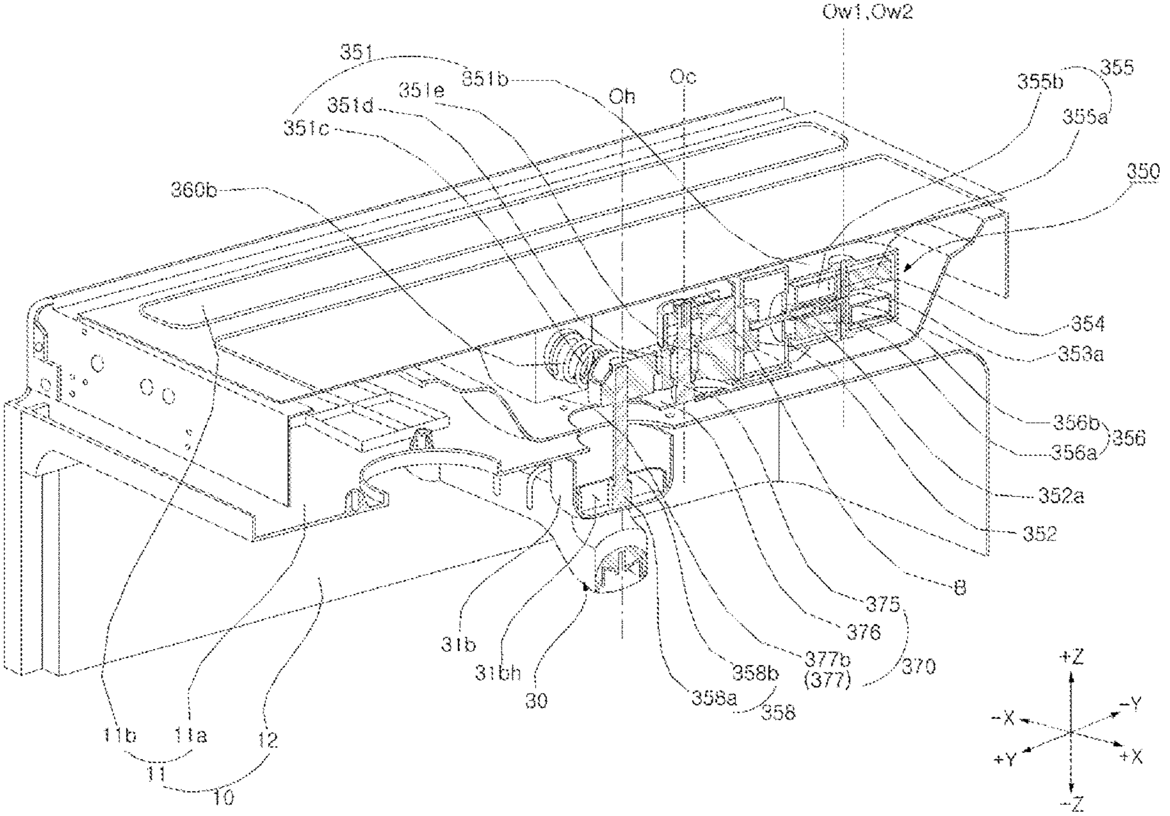
FIG. 17 is a cross-sectional view when the vibration module 350 according to the third embodiment, an elastic member 360, and the support member 370 are vertically taken along line S3-S3'.
Figure 18:
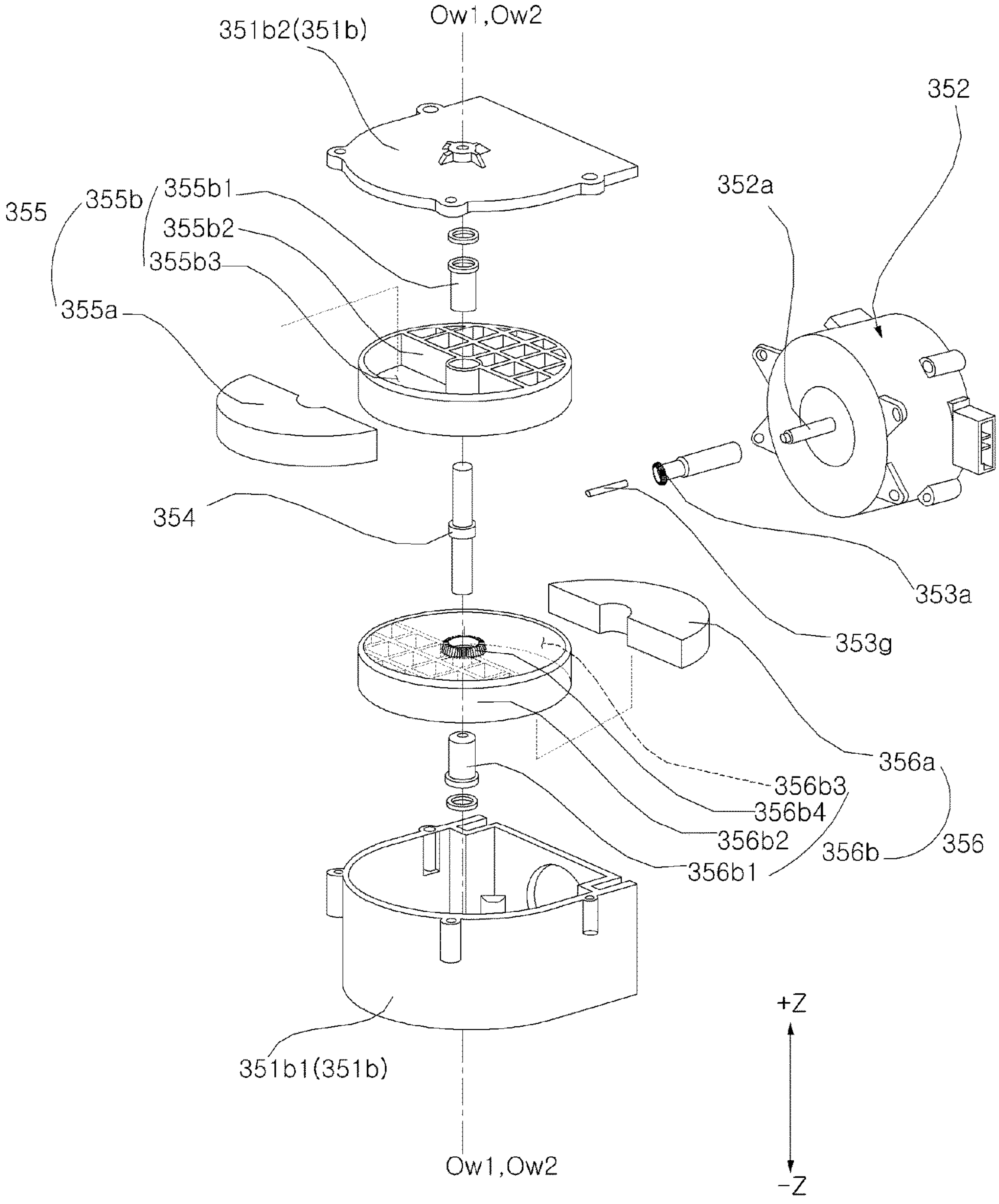
FIG. 18 is an exploded perspective view illustrating a weight casing 351*b* of the vibration module 350, a motor 352, a transmission unit 353, a weight shaft 354, a first eccentric portion 355, and a second eccentric portion 356 of FIG. 14.

For example, in FIG. 13, when the center transmission unit 253*c* rotates in the clockwise direction, the first transmission unit 253*a* and the second transmission unit 253*b* are wound around the center transmission unit 253*c* and rotate in the clockwise direction, and the eccentric portion 255 and the second eccentric portion 256 rotate in the clockwise direction. In FIG. 13, the positions of the central axis Oc, the first rotation axis Ow1, the second rotation axis Ow2, and the connection axis Oh are illustrated.

Hereinafter, referring to FIGS. 14 to 19, the configurations of the vibration module 350, the elastic member 360, and the support member 370 according to the third embodiment will be described in detail.

The vibrating body 351 may include the weight casing 351*b* which accommodates the first eccentric portion 355 and the second eccentric portion 356 therein. The weight casing 351*b* is disposed at a position spaced apart from the central axis Oc in the centrifugal direction Dr1.

The weight casing 351*b* may include a first part 351*b*1 forming an upper portion and a second part 351*b*2 forming a lower portion. The second part 351*b*2 may form an inner space forming a lower surface and a circumferential surface, and the first part 351*b*1 may cover an upper portion of the inner space. The first eccentric portion 355 and the second eccentric portion 356 may be disposed vertically in the inner space of the weight casing 351*b*. The weight casing 351*b* may be coupled to motor 352. A hole into which the motor shaft 352*a* is inserted may be formed on a side surface of the weight casing 351*b*.

The vibrating body 351 may include a base casing 351*d* rotatably supported on the central shaft portion 375. The central shaft portion 375 is disposed to penetrate the base casing 351*d*. The bearing B is interposed between the central shaft portion 375 and the base casing 351*d*. The base casing 351*d* is disposed between the weight casing 351*b* and an elastic member mount 351*c*.

The vibrating body 351 may include a motor support portion 351*e* which supports the motor 352. The motor support portion 351*e* may support a lower end of the motor. The motor support portion 351*e* may be disposed between the weight casing 351*b* and the base casing 351*d*.

The vibrating body 351 may include the elastic member mount 351*c* with which one end of the elastic member 360 engages. When the vibration module 350 performs rotational vibration motion, the elastic member mount 351*c* presses the elastic member 360 or receives a restoring force from the elastic member 360.

The elastic member mount 351*c* may be disposed on one end of the centrifugal direction Dr1 of the vibrating body 351. The elastic member mount 351*c* may be extended to connect a portion between the central axis Oc and the connection axis Oh. The elastic member mount 351*c* may extend in a centrifugal direction Dr1 to form a distal end. The elastic member mount 351*c* is disposed on a side opposite to the first and second rotation axes Ow1 and Ow2 based on the central axis Oc. The elastic member mount 351*c* may be fixed to the base casing 351*d*. The elastic member mount 351*c*, the base casing 351*d*, and the motor support 351*e* may be integrally formed with each other.

The motor 352 may be disposed at a position spaced apart from the central axis Oc. The motor 352 may be disposed between the central axis Oc and the first and second rotation axes Ow1 and Ow2. The motor 352 has the motor shaft 352*a* that is vertically disposed with the central axis Oc. The motor shaft 352*a* may protrude in a centrifugal direction DO from the motor. The motor shaft 352*a* protrude to be inserted into a portion between the first eccentric portion 355 and the second eccentric portion 356. The motor shaft 352*a* is connected to the transmission unit 353.

The transmission unit 353 includes a bevel gear 353*a* which rotates integrally with the motor shaft 352*a*. The bevel gear 353*a* forms a plurality of gear teeth arranged along the circumferential direction of the motor shaft 352*a*. Assuming an imaginary straight line disposed along a rotation axis of the motor shaft 352*a*, the bevel gear 353*a* includes a plurality of gear teeth having an inclination closer to the imaginary straight line as the gear teeth go in a protruding direction of the motor shaft 352*a*. The bevel gear 353*a* is disposed between the first eccentric portion 355 and the second eccentric portion 356.

The transmission unit 353 may include a transmission shaft 353*g* rotatably supporting the bevel gear 353*a*. One end of the transmission shaft 353*g* may be fixed to the weight shaft 354 and the other end thereof may be inserted into the center of the bevel gear 353*a*. The transmission shaft 353*g* may be fixed to the central portion of the weight shaft 354. The transmission shaft 353*g* is disposed between the first eccentric portion 355 and the second eccentric portion 356.

The weight shaft 354 provides the function of the first rotation axis Ow1 and the function of the second rotation axis Ow2. The weight shaft 354 is disposed on the rotation axes Ow1 and Ow2. The weight shaft 354 is disposed at a position spaced apart from the central axis Oc in the centrifugal direction Dr1. The weight shaft 354 is fixed to the vibrating body 351. The upper and lower ends of the weight shaft 354 are fixed to the weight casing 351*b*. The weight shaft 354 is disposed through the first rotating portion 355*b* and the second rotating portion 356*b*.

The first eccentric portion 355 and the second eccentric portion 356 may be arranged to be spaced apart from each other along the central axis Oc. The first eccentric portion 355 and the second eccentric portion 356 may be disposed to face each other vertically. The first eccentric portion 355 may be disposed above the second eccentric portion 356.

The first eccentric portion 355 may include the first weight member 355*a* and the first rotating portion 355*b*. The first rotating portion 355*b* may include a central portion 355*b*1 rotatably contacting the weight shaft 354. The weight shaft 354 is disposed to penetrate the central portion 355*b*1. The central portion 355*b*1 extends along the rotation axes Ow1 and Ow2. The central portion 355*b*1 forms a central hole along the rotation axes Ow1 and Ow2. The central portion 355*b*1 may be formed in a pipe shape.

The first rotating portion 355*b* may include a peripheral portion 355*b*2 seated on the central portion 355*b*1. The central portion 355*b*1 is disposed to penetrate the peripheral portion 355*b*2. The peripheral portion 355*b*2 may be formed in a cylindrical shape extending along the rotation axes Ow1 and Ow2 as a whole. The peripheral portion 355*b*2 may have a seating groove 355*b*3 on which the first weight member 355*a* is seated. The seating groove 355*b*3 may be formed such that an upper side thereof is open. A side surface of the seating groove 355*b* about the rotation axes Ow1 and Ow2 in the centrifugal direction may be formed to be blocked. The peripheral portion 355*b*2 and the first weight member 355*a* rotate integrally with each other.

The first eccentric portion 355 includes a toothed portion 355*b*4 which engages with the bevel gear 353*a* and receives a rotational force. The toothed portion 355*b*4 is formed on a lower surface of the peripheral portion 355*b*2. The toothed portion 355*b*4 is disposed around the rotation axes Ow1 and Ow2 in the circumferential direction. The toothed portion 355*b*4 has an inclination closer to the upper side as the toothed portion 355*b*4 goes away from the rotation axes Ow1 and Ow2.

The second eccentric portion 356 may include a second weight member 356*a* and a second rotating portion 356*b*. The second rotating portion 356*b* may include a central portion 356*b*1 rotatably contacting the weight shaft 354. The weight shaft 354 is disposed to penetrate the central portion 356*b*1. The central portion 356*b*1 extends along the rotation axes Ow1 and Ow2. The central portion 356*b*1 forms a central hole along the rotation axes Ow1 and Ow2. The central portion 356*b*1 may be formed in a pipe shape.

The second rotating portion 356*b* may include a peripheral portion 356*b*2 seated on the central portion 356*b*1. The central portion 356*b*1 is disposed to penetrate the peripheral portion 356*b*2. The peripheral portion 356*b*2 may be formed in a cylindrical shape extending along the rotation axes Ow1 and Ow2 as a whole. The peripheral portion 356*b*2 may have a seating groove 356*b*3 on which a second weight member 356*a* is seated. The seating groove 356*b*3 may be formed such that a lower side thereof is open. A side surface of the seating groove 356*b*3 about the rotation axes Ow1 and Ow2 in the centrifugal direction may be formed to be blocked. The peripheral portion 356*b*2 and the second weight member 356*a* rotate integrally with each other.

The second eccentric portion 356 includes a toothed portion 356*b*4 which engages with the bevel gear 353*a* and receives a rotational force. The toothed portion 356*b*4 is formed on an upper surface of the peripheral portion 356*b*2. The toothed portion 356*b*4 is disposed around the rotation axes Ow1 and Ow2 in the circumferential direction. The toothed portion 356*b*4 has an inclination closer to the lower side as the toothed portion 356*b*4 goes away from the rotation axes Ow1 and Ow2.

Figure 19:
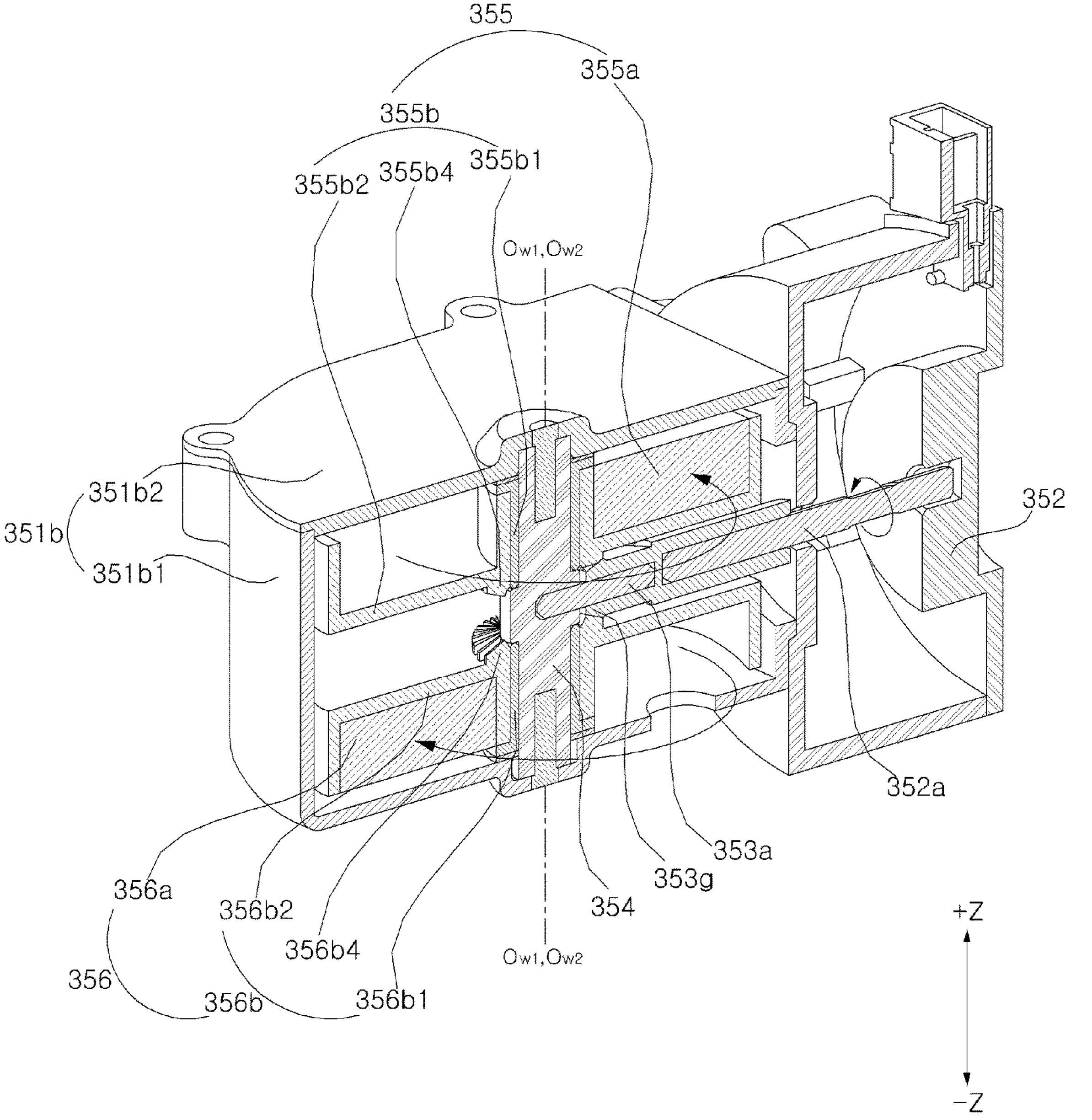
FIG. 19 is a cross-sectional view taken vertically in a state where parts of FIG. 14 are assembled to each other.

For example, in FIG. 19, when the motor shaft 352*a* and the bevel gear 353*g* rotate in one direction, the first eccentric portion 355 rotates in the counterclockwise direction, and the second eccentric portion 356 rotates in the clockwise direction. The first eccentric portion 355 and the second eccentric portion 356 rotate in directions opposite to each other.

The hanger driving unit 358 includes the connecting rods 358*a* and 358*b* fixed to the vibrating body 351. Upper ends of the connecting rods 358*a* and 358*b* may be fixed to the vibrating body 351. The connecting rods 358*a* and 358*b* rotate integrally with the vibrating body 351. The connecting rods 358*a* and 358*b* may be disposed on the connection axis Oh. The connecting rods 358*a* and 358*b* may transmit the rotational force of the vibrating body 351 to the hanger body 31.

The connecting rods 358*a* and 358*b* may include the vertical extension portion 358*b* extending in an up-down direction. The vertical extension portion 358*b* may extend along the connection axis Oh. An upper end of the vertical extension portion 358*b* may be fixed to the elastic member mount 351*c*. The connecting rods 358*a* and 358*b* include the protrusions 358*a* formed on a distal end of the vertical extension portion 358*b*. The protrusion 358*a* is disposed on a lower end of the vertical extension 358*b*.

The vibration module 350 includes the elastic member engaging portion 359 with which one end of the elastic member 360 engages. When the vibration module 350 rotates about the central axis Oc, the elastic member 360 is elastically deformed by the elastic member engaging portion 359, or the resilient force of the elastic member 360 is transmitted to the elastic member engaging portion 359. The elastic member engaging portion 359 is disposed on the elastic member mount 351*c*.

The elastic member engaging portion 359 may include the first engaging portion 359*a* with which one end of the first elastic member 360*a* engages. The first engaging portion 359*a* may be formed on one side +X of the elastic member mount 351*c*. The elastic member engaging portion 359 may include the second engaging portion 359*b* with which one end of the second elastic member 360*b* engages. The second engaging portion 359*b* may be formed on the other side −X of the elastic member mount 351*c*.

The elastic member 360 may be disposed between the vibration module 350 and the support member 370. One end of the elastic member 360 is engaged by the vibration module 350 and the other end thereof is engaged by the elastic member seating portion 377 of the support member 370. The elastic member 360 may include a tension spring and/or a compression spring. A pair of elastic members 360*a* and 360*b* may be disposed on both sides of the connection axis Oh in the vibration directions +X and −X. The elastic member 360 may be disposed at a position spaced apart from the central axis Oc.

The plurality of elastic members 360*a* and 360*b* may be provided. Each of the elastic members 360*a* and 360*b* may be provided to be elastically deformed when the vibration module 350 rotates in one of the clockwise direction DI1 and the counterclockwise direction D12, and restored elastically when the vibration module 350 rotates in the other direction. Each of the elastic members 360*a* and 360*b* may be provided to be elastically deformed when the hanger body 31 moves in one of the vibration directions +X and −X and elastically restored when the hanger body 31 moves in the other direction.

The first elastic member 360*a* is disposed on one side +X of the vibrating body 351. One end of the first elastic member 360*a* may engage with the first engaging portion 359*a*, and the other end thereof may engage with the first seating portion 377*a* of the support member 370. The first elastic member 360*a* may include a spring which is elastically deformed and elastically restored in the vibration directions +X and −X.

The second elastic member 360*b* is disposed on the other side −X of the vibrating body 351. The elastic member mount 351*c* is disposed between the first elastic member 360*a* and the second elastic member 360*b*. One end of the second elastic member 360*b* may engage with the second engaging portion 359*b*, and the other end thereof may engage with the second seating portion 377*b* of the support member 370. The second elastic member 360*b* may include a spring which is elastically deformed and elastically restored in the vibration directions +X and −X.

The support member 370 includes the central shaft portion 375 protruding along the central axis Oc. The central shaft portion 375 may protrude upward from a central shaft support 376. The central shaft portion 375 is inserted into a hole formed in the vibrating body 351. The central shaft portion 375 rotatably supports the vibrating body 351 through the bearing B.

The support member 370 may include a central axis support 376 to which the central shaft portion 375 is fixed. The central shaft support 376 may be disposed to be spaced downward from the vibrating body 351. The central shaft support 376 is fixed to the frame 10.

The support member 370 includes the elastic member seating portion 377 to which one end of the elastic member 360 is fixed. The elastic member seating portion 377 is fixed to the frame 10. The elastic member seating portion 377 may be fixed to the inner frame 11*a*. The first seating portion 377*a* and the second seating portion 377*b* are disposed to be spaced apart from each other in the directions opposite to each other about the connection axis Oh.

The invention claimed is:

1. A clothing treatment apparatus comprising:

a frame;

a hanger body provided to hang clothing or a hanger; and a vibration module generating vibration, and configured to move the hanger body with respect to the frame, wherein the vibration module comprises:

a first eccentric portion rotating about a predetermined first rotation axis;

a second eccentric portion rotating about a predetermined second rotation axis that is spaced apart from and parallel to the first rotation axis; and a vibrating body fixed to a predetermined central axis that is fixed to the frame and disposed between the first rotation axis and the second rotation axis, and wherein the first eccentric portion and the second eccentric portion rotate in the same direction to rotate the vibrating body about the central axis.

2. The clothing treatment apparatus according to claim 1, wherein a direction in which the first eccentric portion is located with respect to the first rotation axis is opposite to a direction in which the second eccentric portion is located with respect to the second rotation axis.

3. The clothing treatment apparatus according to claim 1, wherein the vibration module further comprises a hanger driving unit that connects the hanger body and the vibration body, wherein the hanger body comprises a hanger driven unit connected to the hanger driving unit and configured to vibrate in a predetermined vibration direction (+X, −X), and wherein either the hanger driving unit or the hanger driven unit has a slit that extends in a direction (+Y, −Y) intersecting the vibration direction (+X, −X), and the other has a protruding portion that protrudes in parallel with the central axis and is inserted into the slit.

4. The clothing treatment apparatus according to claim 1, wherein the first rotation axis and the second rotation axis are spaced apart from each other in opposite directions based on the central axis.

5. The clothing treatment apparatus according to claim 4, wherein (i) a distance between the first rotation axis and the central axis and (ii) a distance between the second rotation axis and the central axis are provided to be same as each other.

6. The clothing treatment apparatus according to claim 5, wherein (i) an angular speed of the first eccentric portion about the first rotation axis and (ii) an angular speed of the second eccentric portion about the second rotation axis are preset to be same as each other.

7. The clothing treatment apparatus according to claim 1, wherein the first eccentric portion and the second eccentric portion are provided in the same shape, and the weight of the first eccentric portion and the weight of the second eccentric portion are the same.

8. The clothing treatment apparatus according to claim 1, further comprising:

a motor disposed at the vibrating body and disposed between the first rotation axis and the second rotation axis; and a transmitting portion disposed at the vibrating body and transmitting the torque of the motor to the first eccentric portion and the second eccentric portion.

9. The clothing treatment apparatus according to claim 8, wherein the transmission unit includes:

a center transmission unit which integrally rotates with a motor shaft of the motor;

a first transmission unit which includes a gear or a belt for transmitting a rotational force of the center transmission unit to the first eccentric portion; and a second transmission unit which includes a gear or a belt for transmitting the rotational force of the center transmission unit to the second eccentric portion.

10. The clothing treatment apparatus according to claim 9, wherein the first eccentric portion includes:

a first rotating portion which comes into contact with the first transmission unit and rotates about the first rotation axis; and a first weight member which is fixed to the first rotating portion, wherein the second eccentric portion includes:

a second rotating portion which comes into contact with the second transmission unit and rotates about the second rotation axis; and a second weight member which is fixed to the second rotating portion, and wherein a direction in which the first weight member is located with respect to the first rotation axis at an arbitrary time point is opposite to a direction in which the second weight member is located with respect to the second rotation axis.

11. The clothing treatment apparatus according to claim 10, wherein the first weight member and the second weight member are provided at a height overlapping each other.

12. The clothing treatment apparatus according to claim 1, further comprising:

a supporting member fixed to the frame and rotatably supporting the vibration body with respect to the central axis; and an elastic member having one end fixed to the vibration body and the other end fixed to the supporting member.

13. The clothing treatment apparatus according to claim 12, wherein the elastic member comprises:

a first elastic member fixed between the upper side of the vibration body and the supporting member; and a second elastic member fixed between the lower side of the vibration body and the supporting member.

14. The clothing treatment apparatus according to claim 13, wherein the first elastic member and the second elastic member are provided with a torsion spring.

15. The clothing treatment apparatus according to claim 12, wherein when the first elastic member rotates the vibration body in one of clockwise direction and counterclockwise direction, the second elastic member rotates the vibration body in a direction same of the first elastic member.

16. The clothing treatment apparatus according to claim 1, wherein the vibration module further comprises a hanger driving unit that connects the hanger body and the vibration body in front (+Y) of the central axis.

17. The clothing treatment apparatus according to claim 16, wherein, when the vibration body rotates about the central axis, the hanger driving unit rotates together with the vibration body.

18. A clothing treatment apparatus comprising:

a frame;

a hanger module including a hanger body which is disposed to be movable to the frame and is provided to hang clothing or a hanger; and a vibration module which generates vibrations, wherein the vibration module includes:

a vibrating body which is rotatably provided about a predetermined central axis fixed to the frame;

a first eccentric portion which is supported by the vibrating body and rotates about a predetermined first rotation axis spaced apart from the central axis;

a second eccentric portion which is supported by the vibrating body and rotates about a predetermined second rotation axis which is spaced apart from the central axis and is the same as or parallel to the first rotation axis; and a hanger driving unit which is fixed to the vibrating body and is connected to the hanger body at a position spaced apart from the central axis, wherein, when the first eccentric portion rotates the vibrating body in one of clockwise (D11) and counterclockwise (D12) direction (D1) with respect to the central axis, the second eccentric portion rotates the vibrating body in the one direction (D1) with respect to the central axis, and wherein, when the first eccentric portion is positioned with respect to the first rotation axis in one direction (D2) of a centrifugal direction (Dr1) and a mesial direction (Dr2) based on the central axis, the second eccentric portion is positioned with respect to the second rotation axis in a direction opposite to the one direction (D2) based on the central axis.

19. A clothing treatment apparatus comprising:

a frame;

a hanger module including a hanger body which is disposed to be movable to the frame and is provided to hang clothing or a hanger; and a vibration module which generates vibrations, wherein the vibration module includes:

a vibrating body which is rotatably provided about a predetermined central axis fixed to the frame;

a first eccentric portion which is supported by the vibrating body and rotates about a predetermined first rotation axis spaced apart from the central axis;

a second eccentric portion which is supported by the vibrating body and rotates about a predetermined second rotation axis which is spaced apart from the central axis and is the same as or parallel to the first rotation axis; and a hanger driving unit which is disposed in the vibrating body and is connected to the hanger body at a position spaced apart from the central axis, wherein, when weight of the first eccentric portion generates a centrifugal force with respect to the first rotation axis in one direction (D1) of a clockwise direction (D11) and a counterclockwise direction (D12) based on the central axis, the second eccentric portion is provided to generate a centrifugal force with respect to the second rotation axis in the one direction (D1), and wherein, when the first eccentric portion generates a centrifugal force with respect to the first rotation axis in one direction (D2) of a centrifugal direction (Dr1) and a mesial direction (Dr2) based on the central axis, the second eccentric portion is provided to generate a centrifugal force with respect to the second rotation axis in a direction opposite to the one direction (D2).

20. A clothing treatment apparatus comprising:

a frame which forms an exterior and forms a treatment space in which clothing is accommodated;

a hanger module which is movable to the frame in an upper portion of the treatment space and is provided to hang the clothing or a hanger; and a vibration module which is supported by the frame and generates vibrations in the hanger module, wherein the vibration module includes:

a motor which rotates a central axis formed in an up-down direction;

a first eccentric portion which is connected to the motor to be rotated and rotates about a first rotation axis spaced apart to be parallel to the central axis;

a second eccentric portion which is connected to the motor to be rotated and rotates about a second rotation axis spaced apart to be parallel in a direction opposite to the first rotation axis from the central axis;

a vibrating body which supports the motor, rotatably supports the first eccentric portion and the second eccentric portion, and is rotated by a centrifugal force of the first eccentric portion with respect to the first rotation axis and a centrifugal force of the second eccentric portion with respect to the second rotation axis in a clockwise direction and a counterclockwise direction within a predetermined angle range based on the central axis; and a hanger driving unit which transmits a rotational force of the vibrating body rotating within the predetermined angle range to the hanger module.

* * * * *